United States Patent
Parsons

(10) Patent No.: US 8,880,232 B2
(45) Date of Patent: *Nov. 4, 2014

(54) INTELLIGENT METERING DEMAND RESPONSE

(71) Applicant: Leviton Manufacturing Co., Inc., Melville, NY (US)

(72) Inventor: Kevin Parsons, Wilsonville, OR (US)

(73) Assignee: Leviton Manufacturing Co., Inc., Melville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/895,795

(22) Filed: May 16, 2013

(65) Prior Publication Data

US 2013/0253721 A1    Sep. 26, 2013

Related U.S. Application Data

(63) Continuation of application No. 12/618,497, filed on Nov. 13, 2009, now Pat. No. 8,463,453.

(51) Int. Cl.
| | |
|---|---|
| *G05D 11/00* | (2006.01) |
| *G06F 1/26* | (2006.01) |
| *H02J 3/14* | (2006.01) |
| *H02J 13/00* | (2006.01) |
| *H05B 37/02* | (2006.01) |

(52) U.S. Cl.
CPC ... *G06F 1/26* (2013.01); *H02J 3/14* (2013.01); *H02J 13/0062* (2013.01); *H02J 13/0075* (2013.01); *H05B 37/0245* (2013.01); *Y02B 20/48* (2013.01); *Y02B 70/3225* (2013.01); *Y02B 90/2638* (2013.01); *Y02B 90/2653* (2013.01); *Y04S 20/222* (2013.01); *Y04S 40/124* (2013.01); *Y04S 40/126* (2013.01); *Y02B 70/3283* (2013.01); *Y04S 20/246* (2013.01)
USPC .............. 700/295; 700/19; 700/291; 315/149

(58) Field of Classification Search
CPC ...................................... H02J 3/28; H02J 3/14
USPC .............................. 700/295, 19, 291; 315/149
See application file for complete search history.

(56) References Cited

U.S. PATENT DOCUMENTS

| | | | |
|---|---|---|---|
| 3,678,291 A | 7/1972 | Coe | |
| 4,010,386 A | 3/1977 | Rossell | |

(Continued)

FOREIGN PATENT DOCUMENTS

| | | |
|---|---|---|
| EP | 0039869 | 4/1981 |
| EP | 2214287 | 8/2010 |

(Continued)

OTHER PUBLICATIONS

ADMMicro EMS, "Controllers," 2006, 1 page.

(Continued)

*Primary Examiner* — Mohammad Ali
*Assistant Examiner* — Sheela S Rao
(74) *Attorney, Agent, or Firm* — Marger Johnson & McCollom PC

(57) ABSTRACT

A system and method for real-time power management are provided. The system can include one or more lights, one or more light controllers, one or more meters to detect power demand of a building, and a central controller to modify the light output of the lights responsive to the detected power demand. The system can interface with other utility controls to manage the total power demand of the building on a real-time basis. The light controllers can provide individual metering of the lights for use by the central controller.

32 Claims, 15 Drawing Sheets

(56) References Cited

U.S. PATENT DOCUMENTS

| | | | |
|---|---|---|---|
| 4,096,884 A | 6/1978 | Horowitz | |
| 4,296,449 A | 10/1981 | Eichelberger | |
| 4,365,164 A | 12/1982 | Sibley | |
| 4,427,863 A | 1/1984 | Fujita | |
| 4,581,705 A | 4/1986 | Gilker et al. | |
| 4,675,987 A | 6/1987 | Minks et al. | |
| 4,739,351 A | 4/1988 | Feldman | |
| 4,829,457 A | 5/1989 | Russo et al. | |
| 4,835,350 A | 5/1989 | Ozu et al. | |
| 4,835,502 A | 5/1989 | Minnette | |
| 5,258,889 A | 11/1993 | Belanger, Jr. | |
| 5,335,135 A | 8/1994 | Kinney | |
| 5,338,908 A | 8/1994 | Rahman et al. | |
| 5,359,486 A | 10/1994 | Crane et al. | |
| 5,644,463 A | 7/1997 | El-Sharkawi et al. | |
| 5,784,285 A | 7/1998 | Tamaki et al. | |
| 5,930,104 A | 7/1999 | Kadah et al. | |
| 5,936,495 A | 8/1999 | LeCourt | |
| 5,971,597 A | 10/1999 | Baldwin et al. | |
| 6,002,313 A | 12/1999 | Mrenna et al. | |
| 6,188,181 B1 | 2/2001 | Sinha et al. | |
| 6,198,063 B1 | 3/2001 | Kramer | |
| 6,222,448 B1 | 4/2001 | Beck et al. | |
| 6,232,855 B1 | 5/2001 | Malingowski et al. | |
| 6,233,132 B1 | 5/2001 | Jenski | |
| 6,285,157 B1 | 9/2001 | Hain et al. | |
| 6,456,511 B1 | 9/2002 | Wong | |
| 6,497,656 B1 | 12/2002 | Evans et al. | |
| 6,512,682 B2 | 1/2003 | Cohen et al. | |
| 6,525,542 B2 | 2/2003 | Price | |
| 6,633,823 B2 | 10/2003 | Bartone et al. | |
| 6,693,395 B2 | 2/2004 | Wilhelm | |
| 6,741,442 B1 | 5/2004 | McNally et al. | |
| 6,768,615 B2 | 7/2004 | Liu | |
| 6,897,760 B2 | 5/2005 | Kawata et al. | |
| 6,903,554 B2 | 6/2005 | Wilson et al. | |
| 6,993,417 B2 | 1/2006 | Osann, Jr. | |
| 7,046,716 B1 | 5/2006 | Miao | |
| 7,110,225 B1 | 9/2006 | Hick | |
| 7,141,891 B2 | 11/2006 | McNally et al. | |
| 7,171,461 B2 | 1/2007 | Ewing et al. | |
| 7,196,900 B2 | 3/2007 | Ewing et al. | |
| 7,236,338 B2 | 6/2007 | Hale et al. | |
| 7,368,830 B2 | 5/2008 | Cleveland et al. | |
| 7,492,062 B1 | 2/2009 | Wristen et al. | |
| 7,538,645 B2 | 5/2009 | Nishi et al. | |
| 7,656,626 B2 | 2/2010 | Carton et al. | |
| 7,769,149 B2 | 8/2010 | Berkman | |
| 2001/0039626 A1 | 11/2001 | Jauert | |
| 2003/0062990 A1 | 4/2003 | Schaeffer, Jr. et al. | |
| 2003/0161279 A1 | 8/2003 | Sherman | |
| 2004/0034484 A1 | 2/2004 | Solomita et al. | |
| 2004/0054905 A1 | 3/2004 | Reader | |
| 2004/0155722 A1 | 8/2004 | Pruchniak | |
| 2005/0147071 A1 | 7/2005 | Karaoguz et al. | |
| 2005/0185669 A1 | 8/2005 | Welborn et al. | |
| 2005/0203987 A1 | 9/2005 | Ewing et al. | |
| 2005/0243787 A1 | 11/2005 | Hong et al. | |
| 2006/0007627 A1 | 1/2006 | Lewis | |
| 2006/0094461 A1 | 5/2006 | Hameed et al. | |
| 2006/0259538 A1 | 11/2006 | Ewing et al. | |
| 2007/0076340 A1 | 4/2007 | Ewing et al. | |
| 2007/0081505 A1 | 4/2007 | Roberts | |
| 2007/0112939 A1 | 5/2007 | Wilson et al. | |
| 2007/0121265 A1 | 5/2007 | Hill et al. | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |
| 2007/0198748 A1 | 8/2007 | Ametsitsi | |
| 2008/0016452 A1 | 1/2008 | Pincus | |
| 2008/0019063 A1 | 1/2008 | Muller et al. | |
| 2008/0019068 A1 | 1/2008 | Reynolds et al. | |
| 2008/0088180 A1 | 4/2008 | Cash et al. | |
| 2008/0112097 A1 | 5/2008 | Maharsi | |
| 2008/0136261 A1 | 6/2008 | Mierta | |
| 2009/0021213 A1 | 1/2009 | Johnson | |
| 2009/0185333 A1 | 7/2009 | Coomer et al. | |
| 2009/0248217 A1* | 10/2009 | Verfuerth et al. | 700/295 |
| 2009/0259603 A1 | 10/2009 | Housh et al. | |
| 2009/0285189 A1 | 11/2009 | Kim et al. | |
| 2011/0115448 A1 | 5/2011 | Elliott et al. | |
| 2011/0115460 A1 | 5/2011 | Elliott et al. | |
| 2011/0118890 A1 | 5/2011 | Parsons | |
| 2012/0207481 A1 | 8/2012 | Elberbaum | |

FOREIGN PATENT DOCUMENTS

| | | |
|---|---|---|
| JP | 2008302771 | 12/2008 |
| WO | 9010942 | 9/1990 |
| WO | 0182321 | 1/2001 |
| WO | 2006091565 | 8/2006 |
| WO | 2008102147 | 8/2008 |

OTHER PUBLICATIONS

ADMMicro, "What We Do," Controllers, 2006, 3 pages.

Architectural Lighting Magazine, "Load Shedding and Lighting: The New Frontier," printed Mar. 20, 2009, 2 pages.

E-Mon, Energy Monitoring Products, "E-Mon D-Mon Metering Products," printed Jul. 7, 2009, 1 page.

GM Electric Power/Advanced Systems, "Plug-In Electric Vehicles—Standards," Ontario Smart Grid for Forum, Oct. 14, 2008, 17 pages.

I.M.S. Industrial Measurement Systems Ltd., "General Information," 2006, 2 pages.

International Preliminary Report on Patentability for PCT/US2010/044022, dated May 15, 2012, 6 pages.

Leviton, Architectural Lighting Controls, 2007, 39 pages.

Leviton, Product Data "Z-MAX Relay Cards," 2009, 2 pages.

Lighting Controls, "Lighting Control & Design—Product Catalog," Oct. 2008, 100 pages.

Lutron, "Quantum—Whole-Building Light Management Solution," Apr. 30, 2009, 28 pages.

Quad Logic: Power Line Communications Technology, Where There is Power . . . Quadlogic Brings You Knowledge, 2008, 2 pages.

RS485 serial information, http://www.lammerbies.nl/comm/info/RS-485.html.

Shadowmetering, "About Shadow Metering Inc. Jacksonville, Florida," 2009, 1 page.

Site Controls: Product and Services, "The Site-Command Platform," 2009, 1 page.

Society of Automotive Engineers, Inc., Surface Vehicle Recommended Practice, 2001, 32 pages.

SVEA Building Control Systems—Long I/O MOdule REG-M DIM 1-10V, May 16, 2007, 4 pages.

Wattsupmeters, Smart Circuit, "20 AMP Internet Enabled Electricity Controller," Product Information, 2005, 2 pages.

Wattsupmeters, "Smart Circuit—The Intelligent Electricity Monitor that Can Measure and Switch Loads via the Internet," Mar. 30, 2010, 2 pages.

Wattsupmeters, Smart Circuit, "Methodology for Commercial applications," Mar. 30, 2010, 2 pages.

Wattsupmeters, Smart Circuit, "The Intelligent Electricity Monitor that can Measure and Switch Loads via the Internet," Mar. 30, 2010, 2 pages.

Written Opinion and International Search Report for PCT/US2010/044022, dated Feb. 24, 2011, 10 pages.

Quantum total light management, Operation and Maintenance Manual, Lutron, Apr. 2009, 212 pages.

Wattsupmeters, Smart Circuit "Electricity Controller—Applications", 2 pages.

* cited by examiner

INTELLIGENT METERING DEMAND RESPONSE

CROSS REFERENCE TO RELATED APPLICATIONS

This application is a continuation of U.S. patent application Ser. No. 12/618,497 filed Nov. 13, 2009, titled "Intelligent Metering Demand Response," which is incorporated herein in its entirety.

This application is also related to U.S. patent application Ser. No. 12/751,956, filed Mar. 31, 2010, titled "Electrical Switching Module" and U.S. patent application Ser. No. 12/751,993, filed on Mar. 31, 2010, now U.S. Pat. No. 8,324,761, issued on Dec. 4, 2012, titled "Electrical Switching Module," both of which are continuation-in-part applications of U.S. patent application Ser. No. 12/618,497.

BACKGROUND

Traditionally, electrical power usage was measured by a centralized power meter attached to a building. Independent of whether the building was a home, commercial office, or factory, the power usage was measured by a single device that could be read at regular intervals to determine the total power consumption of the facility over a given period. Under this approach, the ability to determine power consumption by time of day or for specific equipment was extremely limited and essentially required some type of continuous monitoring of the power meter correlated to events in the facility.

More recently, a general societal trend towards increased power consumption efficiency, along with corresponding governmental policies and regulations, has driven demand for increased ability to monitor detailed power consumption. Additionally, power suppliers are implementing procedures and billing practices designed to incentivize power efficiency and stabilize the power grid. For example, power suppliers may install meters on buildings that record power usage at fifteen minute intervals. The power supplier can then use this information to charge the building owner a fee based on the building's peak demand in addition to the overall consumption. This additional fee encourages building owners across the grid to reduce their peak demand in order to achieve direct savings and thus increases the power available on the grid during peak hours.

One method to prevent power grid failures that has recently been implemented is called a demand response system. In the demand response system, when a utility provider recognizes that peak load will exceed capacity (or allowable limits), the utility provider can contact one or more building operators and instruct the operators to remove their loads from the power grid. This contact can also be implemented by sending a demand response signal to the buildings. In response, the individual building operators provide the power to their buildings using alternative means (such as a generator) and thus remove their loads from the grid. These arrangements are typically negotiated in advance, and provide penalties to building operators who do not remove their loads. Additionally, current demand response systems are binary in nature; either the buildings loads are on the grid or they are off the grid.

Intelligent metering is another emerging conservation method designed to allow companies to monitor their power consumption based on several parameters such as the time of day, types/amount of equipment operating, occupancy level of the building, etc. Through the use of intelligent metering, companies can identify policies, procedures, and operational practices that are costing the company unnecessary money through increased power consumption and take steps to eliminate these costs. Additionally, as regulatory policies place increased demand on companies for efficiency of power consumption, many companies will need to implement intelligent monitoring in order to meet such regulations. Through intelligent metering companies can also detect faulty equipment that is wasting power and easily identify and fix the problem before significant costs are incurred by increased power consumption.

Although an advancement from prior techniques, intelligent metering still relies upon significant operator involvement in order to realize any power savings. For example, intelligent metering may identify that a company's power consumption increases 25% at a certain time of day during which the company is charged a premium rate due to increased grid-wide demand. Although this information is useful to know, it does not result in any increased efficiency until the company performs an analysis of the causes of the increased load and designs policies to reduce the load. In other words, current practices rely on analyzing historical data, predicting future power consumption, and then implementing policies in order to reduce the future power consumption. As a result, current practices are not flexible enough to provide real-time power consumption control or, in other words, do not allow for proactive control strategies.

Moreover, current implementations of power consumption management rely upon switching loads on or off and/or time shifting to manage power usage. Specifically, if a building is using too much power during peak hours, the only option to reduce consumption is to switch some loads off or move the operation of those loads to other hours of the day. For example, the thermostat for a building may be turned up several degrees so that the fans and compressors of the Heating, Ventilation, and Air Conditioning (HVAC) system run less frequently. As another example, major power-consuming pieces of equipment may be idled during peak hours and scheduled to run after hours instead. All of these measures result in some perceptible change to the environment or operating procedures of occupants in the building. Occupants may, for example, perceive that their work environment is hotter as the thermostat is increased and their productivity may decrease as their bodies respond to the hotter environment. Thus, current on/off solutions may sacrifice productivity for power savings.

One area that is noticeably neglected in existing power consumption management solutions is interior lighting. Interior lighting can represent a significant amount of the total power demand in a building at any given time and may be as much as 70% of the total power demand, depending on the type of building. However, simply turning off the lights in a building is generally not an acceptable solution to decreasing power demand because the occupants of the building will require lighting in order to perform their job functions. Consequently, current power consumption management solutions are ill-suited to reduce the power consumed by interior lighting in order to reduce total power demand.

DETAILED DESCRIPTION

Exemplary embodiments of this patent disclosure provide real-time power consumption management including reductions in power demand due to interior lighting. According to some embodiments, power demand at a given time can be reduced in such a way that changes in power consumption are substantially imperceptible to occupants of a building. As used herein, power demand refers to the instantaneous power load being used by a building, piece of equipment, etc. and is typically measured in kilowatts (KW). Power usage refers to the amount of power used over a period of time and is typically measured in kilowatt-hours (KWH). It is desirable for building operators to reduce both power usage and power demand (in particular, peak power demand) to reduce the costs of their electricity and to meet regulatory and/or certification authority requirements.

Figure 1:
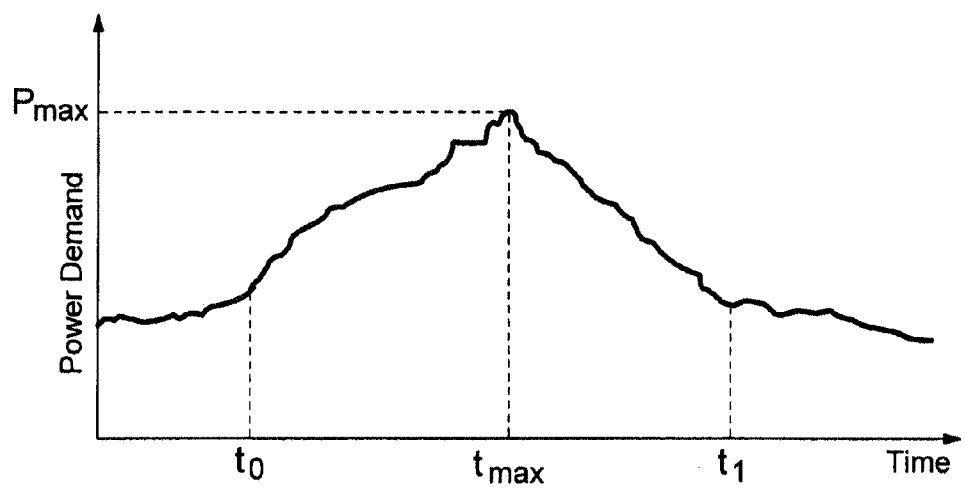
FIG. 1 is a graph illustrating power demand over time for an exemplary building.

FIG. 1 is a graph of power demand over time for an exemplary building. Referring to FIG. 1, over time, the power demand for a building varies depending on the time of day and the power loads operational at any given time. For example, $t_0$ may indicate the beginning of the workday, 8:00 a.m. for instance, and $t_1$ may indicate the end of the workday, 5:00 p.m. Prior to the interval $t_0$-$t_1$, power demand is down because there are very few people in the building. During the interval $t_0$-$t_1$, power demand increases due to increased occupancy of the building causing increased loads from lighting, office equipment, HVAC, etc. At some point, $t_{max}$, during the interval $t_0$-$t_1$, demand may reach a maximum, $P_{max}$. The power supplier for the building may charge a fee based on the value of $P_{max}$ and the fee may be fixed for a significant period of time, such as one year. Thus, the building operator has an incentive to minimize the value of $P_{max}$ in order to reduce overall utility costs. Additionally, the building operator may pay a premium rate during the period $t_0$-$t_1$ and thus the operator has an incentive to minimize the total usage during this period as well.

Conventional methods may not provide a solution for the building operator because of their backward-looking nature. In other words, the point $t_{max}$ has already passed before the operator using conventional systems has the opportunity to adjust the building power demand. Thus, the building operator can only limit $P_{max}$ going forward, but may still have to pay an increased fee due to $P_{max}$ being reached in the past. Additionally, a building operator can plan ahead to reduce peak period loads (one example would be scheduling the water pump that fills a tank on the building to run at night instead of during the day), but the operator does not have any way to adjust for unexpected loads on a real-time basis. Using the tank example, if for some reason, the occupants use an extraordinary amount of water on a given day, the water pump may need to run during the peak period and the building operator does not have any way to adjust for this unplanned load on a real-time basis.

However, according to some embodiments, the power demand of the building can be reduced on a real-time basis before $P_{max}$ is reached, thus reducing the fee that the building operator will be charged. Moreover, the power demand of the building can be adjusted on a real-time basis to maintain some level less than $P_{max}$ in order to limit the total usage over a certain period and thus reduce the premium paid for peak period power usage. These real-time adjustments to power demand may be done in such a way that the changes are substantially imperceptible to the occupants of the building.

Figure 2:
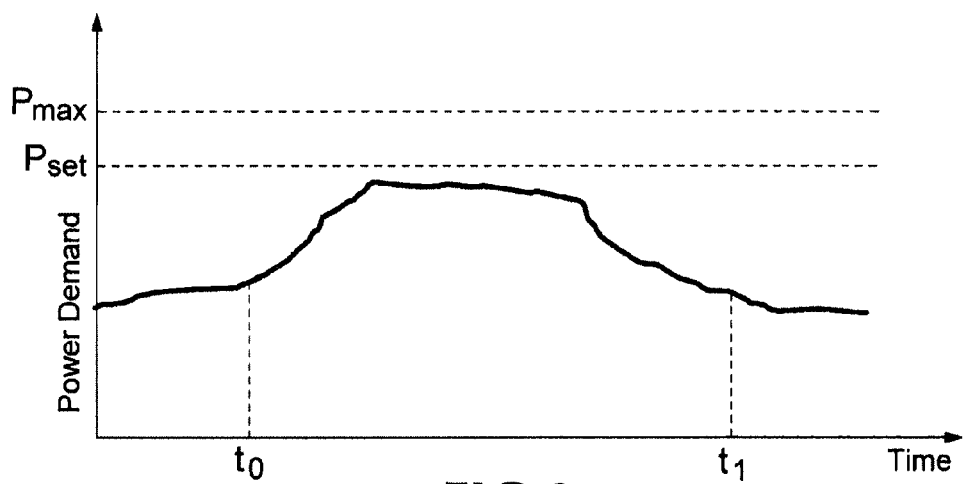
FIG. 2 is a graph illustrating power demand versus time for an exemplary building implementing real-time power management.

FIG. 2 is a graph illustrating power demand versus time for an exemplary building implementing real-time power management. Referring to FIG. 2, the operator of the exemplary building may designate a maximum desired peak power demand, $P_{set}$, which the power management system should make best efforts not to exceed. During the interval $t_0$-$t_1$, as actual power demand of the building approaches $P_{set}$, the power management system can take real-time steps to minimize the chances of actual demand exceeding $P_{set}$. These real-time steps may cause changes that are substantially imperceptible to the occupants of the building. As further described below, the power management system's response may be based on instantaneous values of actual demand or trends in actual demand.

In some cases, the power management system may not be able to prevent demand from exceeding $P_{set}$. As an example, on an extremely hot day, the load from the HVAC system may be so high that the power management system's standard load reducing measures may not be sufficient to keep demand below $P_{set}$. In this case, the power management system may allow demand to exceed $P_{set}$, but initiate a second level of measures designed to ensure demand does not exceed $P_{max}$. These second-level measures may include changes that are perceptible to the occupants of the building.

The description above with respect to FIGS. 1 and 2 focused on controlling and monitoring electrical power. However, a person of ordinary skill in the art will recognize that similar principles apply with respect to other utility services such as natural gas, water, and the like. Accordingly, the inventive principles described herein also encompass these and other utility services.

Figure 3:
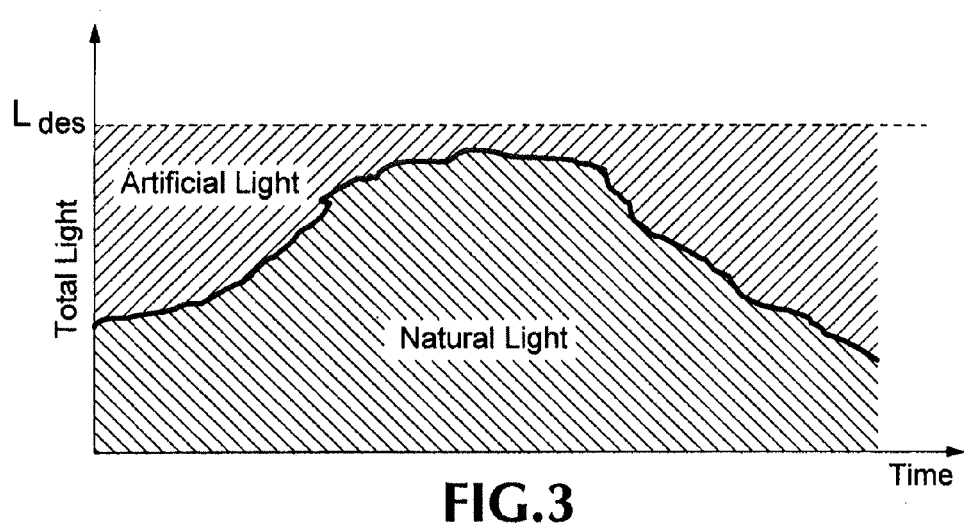
FIG. 3 is a graph illustrating a combination of artificial and natural lighting versus time for an exemplary building.

FIG. 3 is a graph illustrating a combination of artificial and natural lighting versus time for an exemplary building. Referring to FIG. 3 and according to some embodiments, an interior lighting system (also referred to as artificial lighting) can be configured to maintain a stable amount of light on the interior of a building while utilizing natural lighting as much as possible to reduce power consumption. For example, the desired amount of lighting at any given time in the building may be represented by $L_{des}$. $L_{des}$ can be achieved by a combination of artificial and natural lighting by varying the artificial lighting in response to changes in the natural light. Changes in the natural lighting available can be determined by interior light sensors, exterior light sensors, or a combination of both. As shown in FIG. 3, as the natural light varies throughout the day, the interior artificial lighting can be adjusted (using dimmers for example) to maintain a constant total interior light amount at $L_{des}$. Through the use of dimmers, the artificial lighting can be adjusted continuously over the range of light outputs from 0% to 100% of maximum light output such that any amount of light output within the range can be selected. This provides a substantial improvement over existing systems that can only turn lights on or off.

Figure 4:
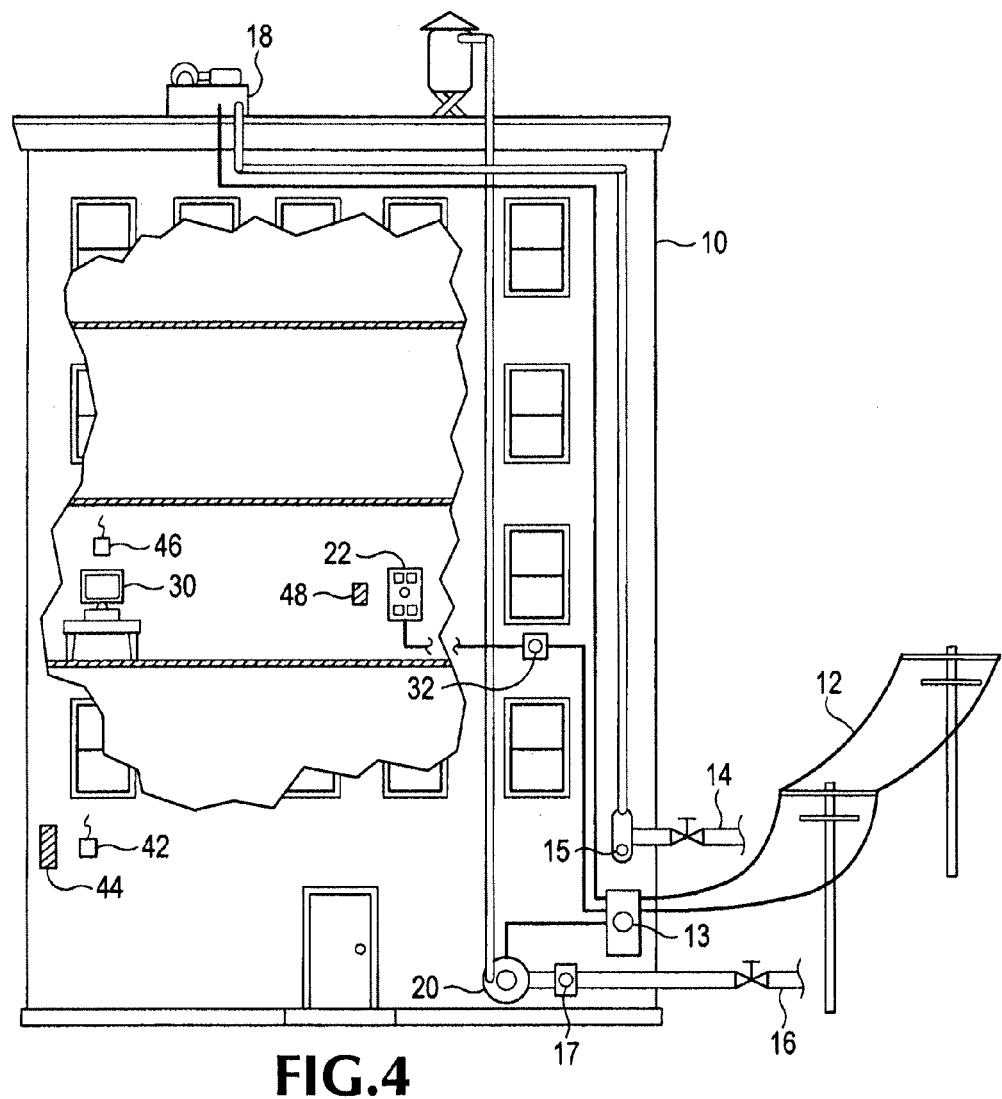
FIG. 4 is an exemplary building incorporating a power management system according to some inventive principles of this patent disclosure.

FIG. 4 is an exemplary building incorporating a power management system according to some inventive principles of this patent disclosure. Referring to FIG. 4, the exemplary building 10 may include various utility service inputs including electricity 12, natural gas 14, and water 16. Additionally, the building 10 may include various building systems and pieces of equipment that provide loads on the utilities including HVAC system 18, water supply system 20, and lighting system 22. The building 10 may also include one or more sensors such as exterior temperature sensor 42, exterior light sensor 44, interior temperature sensor 46, and interior light sensor 48. The temperature sensors 42 and 46 can detect exterior and interior temperatures, respectively, and can be used to predict when the HVAC system 18 is going to increase its load, for example. The light sensors 44 and 48 can detect the amount of light outside and inside the building, respectively, and can be used to determine, for example, what amount of artificial light is necessary to complement the available natural light in order to maintain the interior light at a preset level.

Each of the utility service inputs may have an associated meter including power meter 13, gas meter 15, and water meter 17. Individual loads or groups of loads may also have associated sub-meters, such as lighting sub-meter 32. The meters and sub-meters can provide real-time demand information for the various utility services either at pre-determined intervals or on a continuous basis. Although only one sub-meter 32 is shown, a person of ordinary skill in the art will recognize that a building operator can place sub-meters on any number of major loads and sub-systems in the building 10.

The meters and/or sub-meters may provide inputs to a central controller 30. The central controller 30 can include, for example, a local personal computer, a personal computer connected over a network, a dedicated controller, and/or a remote server. The central controller 30 can control the various loads in the building 10 by cycling equipment on or off, adjusting equipment setpoints, and reducing the power to various loads. The central controller 30 can include a processor to control the various loads and a communication interface to communicate with other lighting and non-lighting controls in a building or utility system. The communication interface can be a network interface to, for example, a local area network or a wireless network. The central controller 30 can also include a display and an input device, such as a keyboard, so that a user can interact with the central controller 30 to, for example, adjust power setpoints, view logged data, and manually control utility and lighting loads in a building. The central controller 30 may include a memory to store logged power demand data and other data.

According to some embodiments, the central controller 30 can monitor and control the various loads in the building 10 on a real-time basis. The building operator may also interact with the central controller 30 to establish setpoints, policies, and the like for controlling the utility service demand of the building 10 and/or the total utility consumption of the building 10.

As an example, the building operator may establish, through the central controller 30, a desired peak power demand of 10 KW for building 10 and a maximum peak power demand of 20 KW. The central controller 30 can then monitor power meter 13 and make adjustments to the various loads in the building 10 to ensure that the power demand does not exceed the setpoints established by the building operator. Specifically, the central controller 30 can make best efforts to maintain power demand below the desired peak power demand of 10 KW by making adjustments to loads that are not perceptible to occupants of the building. However, if the central controller 30 is unable to keep the demand below this setpoint using imperceptible measures, the central controller 30 will then make best efforts to keep demand below the maximum peak power demand setpoint of 20 KW, including measures that might be perceptible to the occupants.

The central controller 30 can control the building power demand in several ways. For example, the central controller 30 can compare the current value of power demand to the setpoint at predetermined intervals or on a continuous basis and then take appropriate steps to reduce power demand when necessary. Alternatively, the central controller 30 can log power demand over time and then periodically compare trends in the power demand to the setpoint to determine if steps need to be taken to reduce power demand.

The central controller 30 can also rely on inputs from other utility service meters or sensors to predict increases in power demand that will require action to prevent exceeding power demand setpoints. For example, the central controller 30 may receive inputs from the exterior temperature sensor 42 indicating that temperatures outside the building are increasing. The central controller 30 can then predict that the HVAC system 18 will soon be operating to reduce interior building temperatures. The central controller 30 can then take steps to reduce other loads in the building 10 to account for the impending load increase due to the HVAC system 18. Similarly, the central controller 30 may see an increased load in the HVAC system 18 due to fans turning on and predict that compressors will soon be operating as well. The central controller 30 can then reduce other loads before the compressors turn on to minimize the peak power demand.

According to some embodiments, the controller 30 can operate the lighting system in a complementary manner to the HVAC system. Specifically, when the controller 30 anticipates that the HVAC system will be increasing its load (by operating compressors for example), the controller 30 can begin dimming lights in the building to compensate for the increased load. When the increased loads are stopped, the controller 30 can begin increasing the light output again. This cycle can recur many times throughout the day without being noticed by the occupants of the building. The controller 30 can base its prediction of when the HVAC system will be increasing and decreasing its load on inputs from one or more thermostats in the building.

Figure 5:
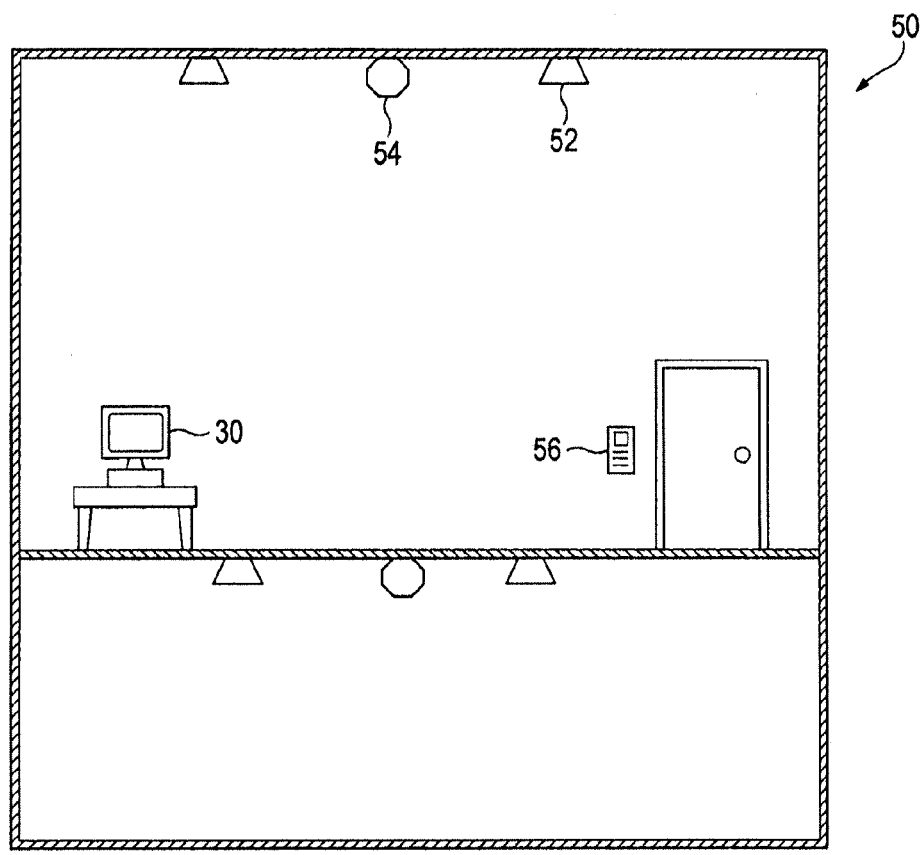
FIG. 5 illustrates a lighting system in the exemplary building of FIG. 4.

FIG. 5 illustrates a lighting system in the exemplary building of FIG. 4. Referring to FIG. 5, the lighting system 50 may include one or more lights 52, one or more sensors 54, and one or more light controls 56. The lights 52 may be any type of lights or combination of lights that would generally be installed in a building, including fluorescent lights, incandescent lights, halogen lights and light-emitting diodes. The sensors 54 may be photocells or other types of sensors that detect the amount of light in a space and/or detect the presence of occupants in the space. The light controls 56 can be any type of device that controls power to the lights 52 such as switches, relays, and/or dimmers. The light controls 56 may also be directly connected to the lights 52 or connected over a wired or wireless network. According to some embodiments, the light controls 56 include dimmers that can adjust the light output from the lights 52 over a range from 0% to 100% of full output at fixed or variable rates. The dimmers can adjust the light output on a continuous basis such that any value within the range can be achieved. Also, the dimmers can adjust the light output for individual lights and/or groups or circuits of lights collectively. The light controls 56 may operate in conjunction with the sensors 54 so that when occupants are present in the space, the lights are on, and when occupants are not in the space, the lights are off. Through the operation of the sensors 54 and the light controls 56, the lights may turn off after a pre-determined time, a delay time, has elapsed since the sensor detected that all occupants left the space. The delay time may be adjustable at the sensors 54, the light controls 56, and/or the central controller 30. Although the lighting system 50 is described with respect to lights 52, the lights 52 are merely an exemplary load. Light controls 56 can be used to operate other loads in the building 10, including those loads that do not provide illumination, on a real-time basis.

According to some embodiments, the light controls 56 and/or the sensors 54 can be in communication with the central controller 30. Thus, the central controller 30 can cause the light controls 56 to turn the lights 52 on or off, adjust the amount of light output from the lights 52 (i.e. dim the lights), and/or adjust the delay time. Each of these methods can be used to reduce the power demand of the lighting system 50. Moreover, some of these methods can be substantially imperceptible to occupants of the building. For example, dimming the lights by about 6% over the course of 20 minutes may be an imperceptible change in lighting to occupants. Similarly, reducing the delay time will not likely result in a perceptible change because occupants have left the space when the delay time begins to run.

By being in communication with the central controller 30, each of the light controls 56 can monitor power demand and/or consumption associated with the light control and its associated lights 52 and report this data to the central controller 30. The central controller 30 can use this data to monitor and adjust power demand and/or consumption for the building 10 on a real-time basis with resolution down to the level of individual lights or loads.

Referring to FIGS. 4 and 5, the building 10 may incorporate several of the lighting systems 50 of FIG. 5. The several lighting systems 10 may each provide light to different spaces in the building 10, including office spaces, manufacturing spaces, living spaces, etc. Additionally, the several lighting systems 10 may each provide light to different organizations operating in the building, such as one lighting system 10 for a bank on one floor in the building 10 and another lighting system 10 for a law firm on a different floor in the building 10. A person of ordinary skill in the art will recognize that many other variations of the lighting system 10 are possible and fall within the inventive principles described herein.

Although only one set of lights 52 and light controls 56 is shown, a person of ordinary skill in the art will recognize that a building may contain multiple circuits of lights and corresponding light controls. Further, the central controller 30 can communicate with individual light controls such that individual light circuits can be dimmed or shut off to reduce the lighting load without affecting other light circuits in the building. For example, a building may have numerous individual light circuits associated with different floors or different occupants and it may be desirable to dim the lights on a certain floor (where a bank is located) while keeping the light level constant on another floor (where a law firm is located). Additionally, individual lighting circuits may be installed in the same space such that the individual circuits provide different lighting options for the space. Also, the light controls may include loads other than lighting (non-lighting loads) that can be similarly controlled. Further description of the light controls 56 is provided below with respect to FIGS. 8-14.

Figure 6:
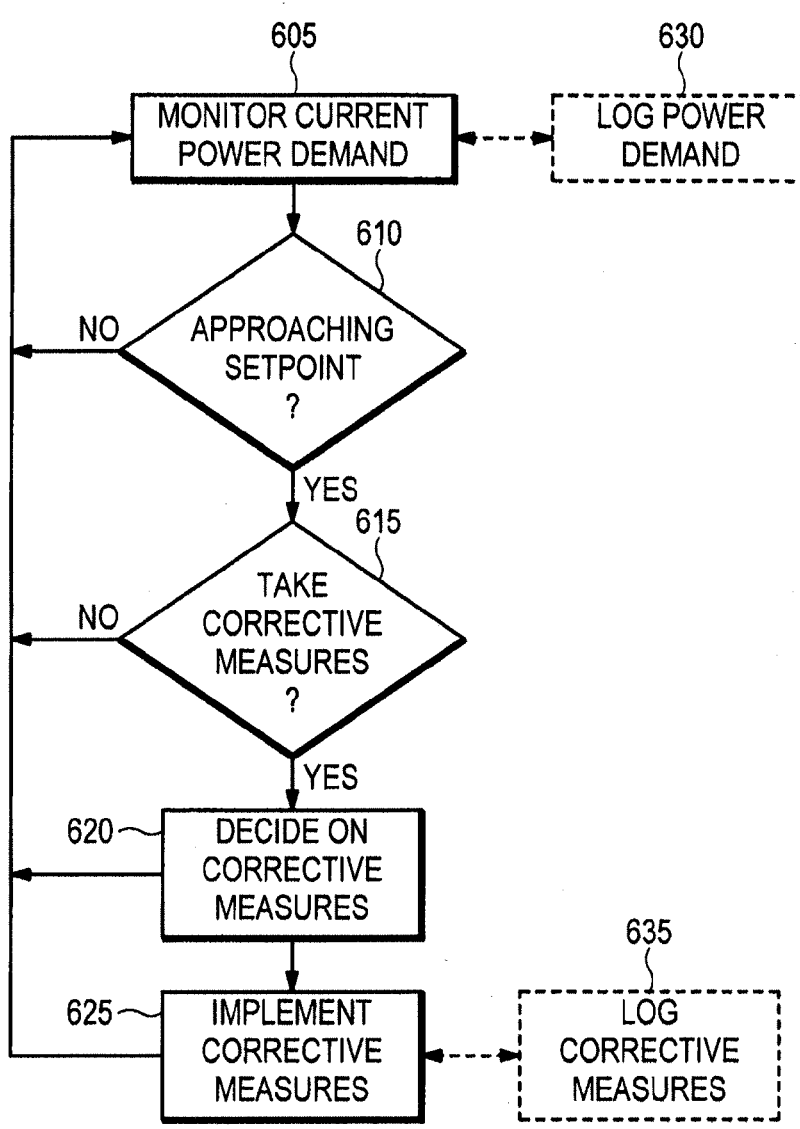
FIG. 6 is a flowchart illustrating real-time power management according to some inventive principles of this patent disclosure.

FIG. 6 is a flowchart illustrating real-time power management according to some inventive principles of this patent disclosure. Referring to FIG. 6, the current power demand for a building is monitored at block 605. The power demand may be monitored by multiple meters or sub-meters, which report the power demand to a central controller either at predetermined intervals or on a continuous basis. Monitoring power demand can also include querying and/or receiving power demand data from individual light controllers or groups of light controllers, as further described below. At block 610, a determination is made as to whether the current power demand is approaching a setpoint. This determination may include comparing an instantaneous value of power demand with the setpoint or it may include comparing multiple power demand values with the setpoint to account for trends in power demand. The setpoint may be an instantaneous power demand setpoint or a set amount of total usage for a given time period. In other words, the setpoint can be used to ensure that a desired instantaneous power demand is not exceed and/or to ensure that a desired total power usage is not exceeded.

If the current demand is approaching the setpoint, a determination is made as to whether corrective measures need to be taken at block 615. The decision of whether to apply corrective measures may depend on factors such as the rate of increase of power demand and the proximity of current power demand to the setpoint. The decision may also be based on factors unrelated to power demand such as time of day, readings from interior/exterior sensors, and the history of prior corrective measures.

If it is decided to take corrective measures, at block 620, a decision is made as to what corrective measures should be implemented. The decision as to what corrective measures should be taken may depend on similar factors to those discussed previously, including time of day, history of prior corrective measures, and the proximity of current power demand to the setpoint. At block 625, the selected corrective measure is implemented. The selected corrective measure can include, for example, dimming the lights throughout the building, dimming the lights in specific spaces in the building, reducing the delay times for light controls in the building, and/or reducing or eliminating other non-lighting loads in the building. Implementing the selected corrective measure can include sending a signal from a central controller to a plurality of light controllers in the building. The signal can direct the light controllers to, among other things, dim the lights, toggle the lights on or off, and/or operate other loads associated with the light controllers, as described below. Once the selected corrective measure is implemented, the method returns to monitoring power demand at block 605.

As shown by alternate block 630, power demand values may be logged for later review and/or to be used as inputs to the decisional steps of the method. Additionally, as shown by alternate block 635, corrective measures may also be logged for later review and/or to be used as inputs to the decisional steps of the method.

Figure 7:
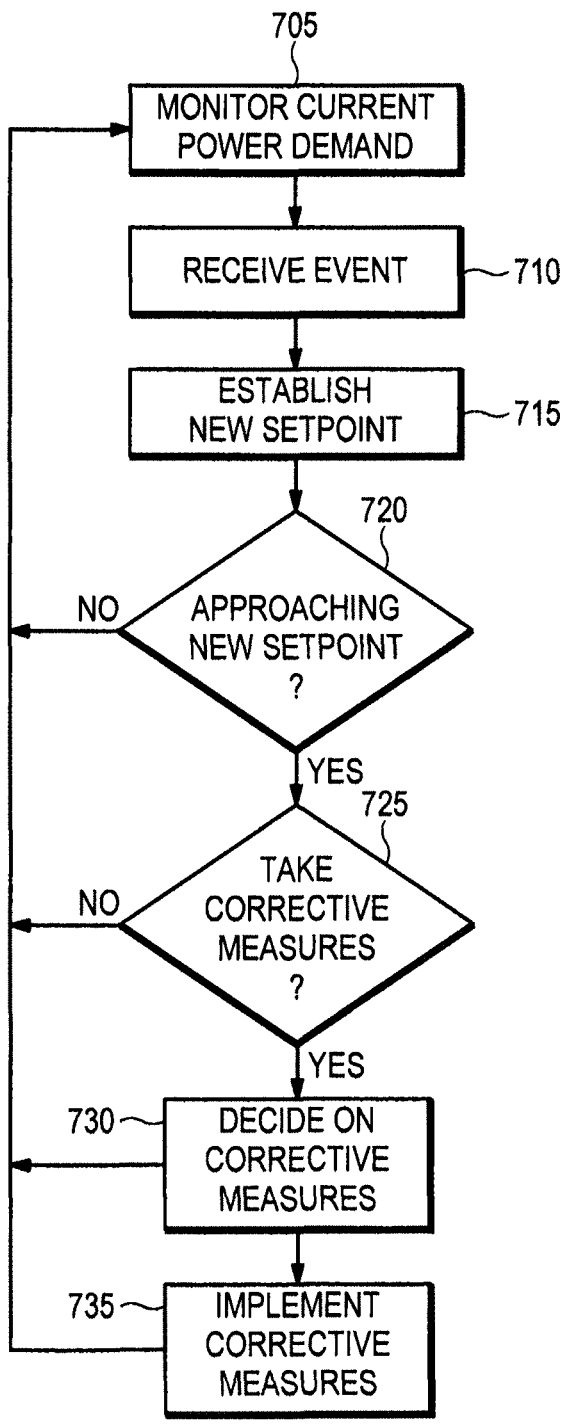
FIG. 7 is a flowchart illustrating event-driven real-time power management according to some inventive principles of this patent disclosure.

FIG. 7 is a flowchart illustrating event-driven real-time power management according to some inventive principles of this patent disclosure. Referring to FIG. 7, the current power demand for a building is monitored at block 705. The power demand may be monitored by multiple meters or sub-meters, which report the power demand to a central controller either at predetermined intervals or on a continuous basis. At block 710, an event is received. The event can be, for example, the input of a new setpoint by a building operator, a predetermined time of day being reached, a predetermined external or internal light value being reached, or a demand response signal being received from a utility supplier. Responsive to the event, a new setpoint is established at block 715.

At block 720, a determination is made as to whether the current power demand is approaching the new setpoint. This determination may include comparing an instantaneous value of power demand with the new setpoint or it may include comparing multiple power demand values with the new setpoint to account for trends in power demand. If the current demand is approaching the new setpoint, a determination is made as to whether corrective measures need to be taken at block 725. The decision of whether to apply corrective measures may depend on factors such as the rate of increase of power demand and the proximity of current power demand to the setpoint. The decision may also be based on factors unrelated to power demand such as time of day, readings from sensors, the history of prior corrective measures, and/or the type of event received.

If it is decided to take corrective measures, at block 730, a decision is made as to what corrective measures should be implemented. The decision as to what corrective measures should be taken may depend on similar factors to those discussed previously, including time of day, history of prior corrective measures, and the type of event received. At block 735, the selected corrective measure is implemented. The selected corrective measure can include, for example, dimming the lights throughout the building, dimming the lights in specific spaces in the building, reducing the delay times for light controls in the building, and/or reducing or eliminating other non-lighting loads in the building. Implementing the selected corrective measure can include sending a signal from a central controller to a plurality of light controls in the building. Once the selected corrective measure is implemented, the method returns to monitoring power demand at block 705.

Figure 8:
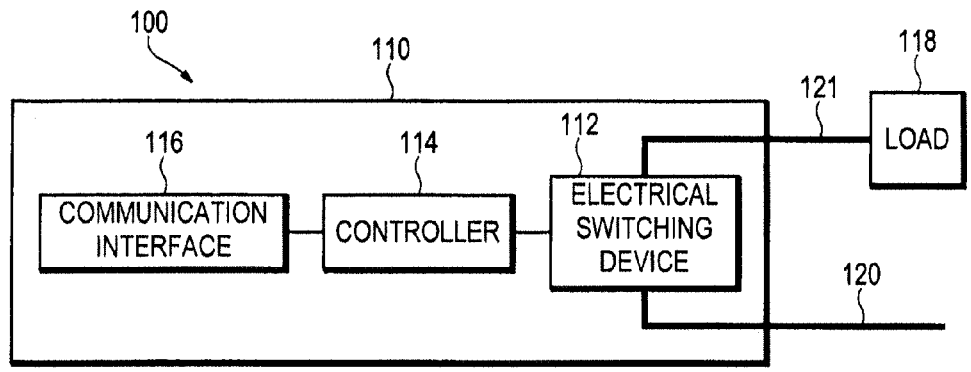
FIG. 8 illustrates an embodiment of an electrical switching module according to some inventive principles of this patent disclosure.

FIG. 8 illustrates an embodiment of an electrical switching module according to some inventive principles of this patent disclosure. The module 100 can correspond to the light controls 56 described above. In this embodiment, the module 100 includes a case 110. The case 110 substantially encapsulates an electrical switching device 112 and a module controller 114. The electrical switching device 112 can be a relay, a circuit breaker, a switch, or any other type of device or combination of devices that can control current to a load 118. The load 118 can correspond to, for example, the lights 52 described above, or other loads in the building 10. The electrical switching device 112 can be an air-gap relay, a solid-state relay, a combination of such relays, or the like. In particular, in an embodiment, the electrical switching device 112 can be configured to be coupled to line wiring 120. Load wiring 121 can couple the electrical switching device 112 to the load 118.

The module controller 114 can include a processor or processors such as digital signal processors, programmable or non-programmable logic devices, microcontrollers, application specific integrated circuits, state machines, or the like. The module controller 114 can also include additional circuitry such as memories, input/output buffers, transceivers, analog-to-digital converters, digital-to-analog converters, or the like. In yet another embodiment, the module controller 114 can include any combination of such circuitry. Any such circuitry and/or logic can be used to implement the module controller 114 in analog and/or digital hardware, software, firmware, etc., or any combination thereof.

The module controller 114 is coupled to the electrical switching device 112. Accordingly, the module controller 114 can be configured to monitor the electrical switching device 112. For example, the module controller 114 can be configured to sense aspects associated with the electrical switching device 112 such as current, voltage, amplitude, frequency, or the like. The module controller 114 can be configured to actuate the electrical switching device 112. As the electrical switching device 112 and the module controller 114 are substantially encapsulated by the case 110, higher level functionality can be presented to a user of the module 100.

In an embodiment, the module 100 can also include a communication interface 116. The communication interface 116 can include any variety of interfaces. For example the communication interface 116 can include a wired or wireless interface. The communication interface 116 can include a serial interface or a parallel interface. In an embodiment, a MODBUS interface can be used. In another embodiment, an Ethernet interface, controller area network interface, or the like can be used.

Accordingly, the module controller 114 can be configured to communicate monitored parameters, expose functionality of the electrical switching device 112, provide functionality beyond actuation for the electrical switching device 112, or the like to a user. Thus, the module 100 can present more functionality beyond switching control. In an embodiment, the module controller 114 can communicate with the central controller 30 in the building 10 through the communication interface 116 to provide individual power demand data associated with the module controller 114 (for example, the power demand of the load 118). Similarly, the central controller 30 can communicate with the module controller 114 through the communication interface 116 to direct operation of the electrical switching device 112 or other operations (such as dimming) described below.

Moreover, although a communication network such as a controller area network, a MODBUS network, or the like can be used, a more general purpose network can be used. For example, as described above the communication interface 116 can include an Ethernet interface. Each module could have a globally unique address, such as an IPv6 address. Thus, each module could be individually accessible, controllable, monitorable, or the like from an arbitrary location or system, for example, central controller 30.

Figure 9:
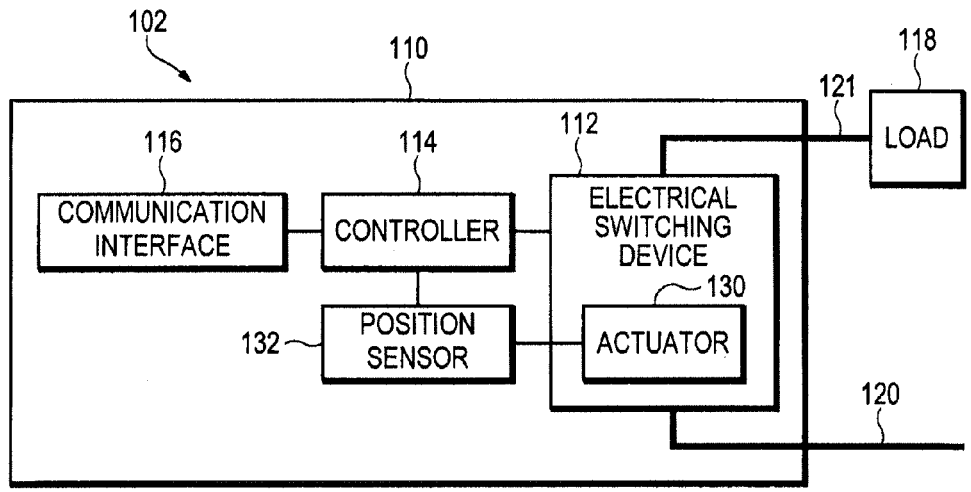
FIG. 9 illustrates an embodiment of an electrical switching module with a position sensor according to some inventive principles of this patent disclosure.

FIG. 9 illustrates an embodiment of an electrical switching module with a position sensor according to some inventive principles of this patent disclosure. In this embodiment, the electrical switching device 112 includes an actuator 130. The actuator 130 can include a mechanism coupled to a contact of the electrical switching device 112.

In an embodiment, the actuator 130 can be a manual actuator. The manual actuator can be operable by a user to actuate the electrical switching device 112. For example, the manual actuator can be accessible through the case 110, coupled to a structure accessible through the case 110 and coupled to the electrical switching device 112, or the like. For example, a lever of the electrical switching device 112 can be moved to actuate the electrical switching device 112. The lever of the electrical switching device 112 can be coupled to another lever that is operable through the case 110. However, in other embodiments, other manual controls such as buttons, knobs, switches, or the like can be used.

The module 102 can include a position sensor 132. The position sensor is configured to sense a state of the electrical switching device 112. A state of the electrical switching device 112 can include open, closed, fault, transitioning, or the like. For example, the position sensor 132 can be coupled to a manual actuator. The position sensor 132 can be configured to sense a position of the manual actuator. In another embodiment, the position sensor 132 can be coupled to the electrical switching device 112 regardless of the presence of a manual actuator to sense the state.

The position sensor 132 can include a variety of sensors. For example, a photointerruptor can be used as a position sensor 132. A manual actuator can be coupled to the photointerruptor such that an actuation of the manual actuator can actuate the photointerruptor in response to the state of the electrical switching device 112.

In another example, a mechanical contact sensor that makes or breaks an electrical circuit can be used. In yet another example, a digital position encoder can be used to sense the position of a structure of the electrical switching device 112. Any sensor that can sense position, movement, acceleration, or the like can be used. That is, the position sensor 132 can be configured to sense more than position, unable to sense actual position but infer position from velocity, or the like. The electrical switching device 112 can be coupled to any of these position sensors 132 such that the state of the electrical switching device 112 can be sensed.

Figure 10:
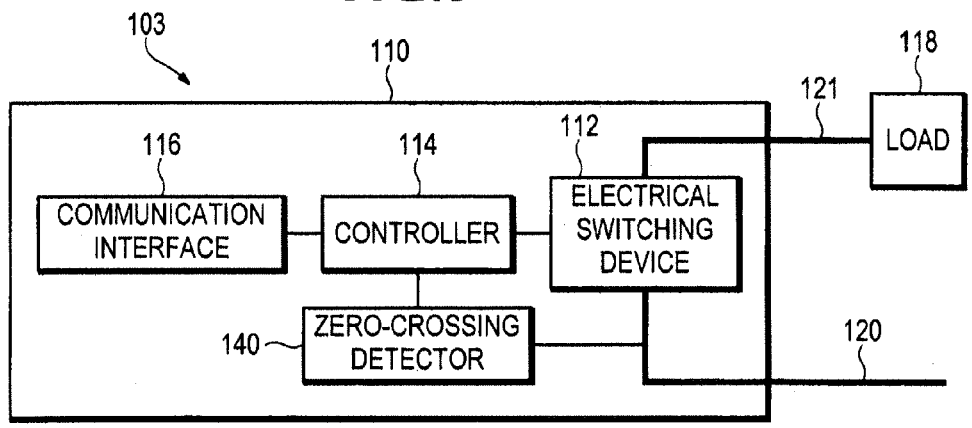
FIG. 10 illustrates an embodiment of an electrical switching module with a zero-crossing detector according to some inventive principles of this patent disclosure.

FIG. 10 illustrates an embodiment of an electrical switching module with a zero-crossing detector according to some inventive principles of this patent disclosure. In this embodiment, the module 103 includes a zero-crossing detector 140. The zero-crossing detector 140 is configured to detect a zero-crossing associated with the electrical switching device 112.

For example, with an alternating current (AC) line voltage on the line wiring 120, the instantaneous voltage across the electrical switching device 112 can vary around zero volts. As illustrated the zero-crossing detector 140 is coupled to the line wiring 120. Accordingly, the zero-crossing detector 140 can be configured to detect a zero-crossing of the voltage on the line wiring.

In another embodiment, the zero-crossing can be a current zero-crossing. The zero-crossing detector 140 can be configured to sense such a current zero-crossing. Accordingly, the zero-crossing detector 140 can be configured to detect a variety of zero-crossings. Moreover, the zero-crossing detector 140 can be configured to detect multiple zero-crossings. For example, depending on the load 118, the zero-crossing of the current can be out of phase with the voltage zero-crossing. The zero-crossing detector 140 can be configured to sense both voltage and current zero-crossings. Furthermore, although the zero-crossing detector 140 is illustrated coupled to the line wiring 120 coupled to the electrical switching device 112, the zero-crossing detector 140 can be coupled to any appropriate circuitry to sense the corresponding zero-crossings.

The zero-crossing detector 140 can be coupled to the module controller 114. Accordingly, the module controller 114 can be configured to report the zero-crossings, operate in response to the zero-crossings, or the like. For example, as will be described in further detail below, the module controller 114 can be configured to actuate the electrical switching device 112 in response to the zero-crossing detector 140.

Figure 11:
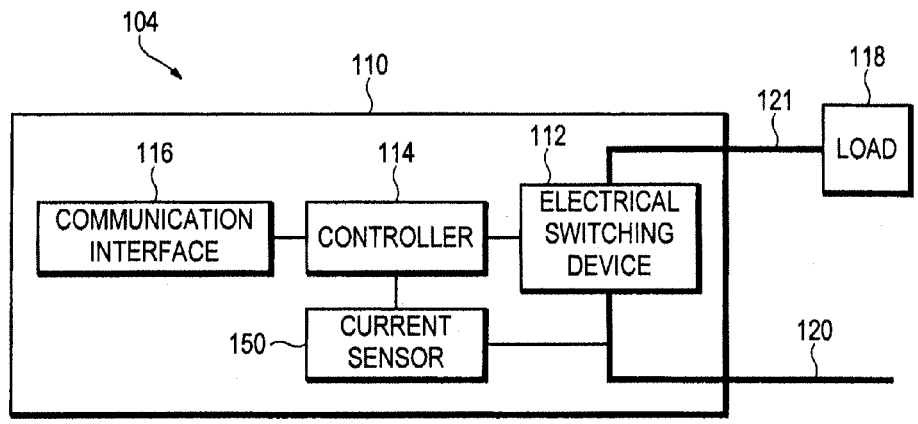
FIG. 11 illustrates an embodiment of an electrical switching module with a current sensor according to some inventive principles of this patent disclosure.

FIG. 11 illustrates an embodiment of an electrical switching module with a current sensor according to some inventive principles of this patent disclosure. In this embodiment, the module 104 includes a current sensor 150. The current sensor 150 is configured to sense a current passing through the electrical switching device 112. Moreover, the current sensor 150 can be configured to sense other currents associated with the electrical switching device 112. For example, a current used in energizing a coil of the electrical switching device 112 can be measured.

The current sensor 150 can be a variety of devices. For example, the current sensor can be a hall-effect sensor, an inline current sensor, or the like. The current sensor 150 can be coupled to the module controller 114. Accordingly, the module controller 114 can be configured to report the sensed current, operate in response to the sensed current, or the like.

Figure 12:
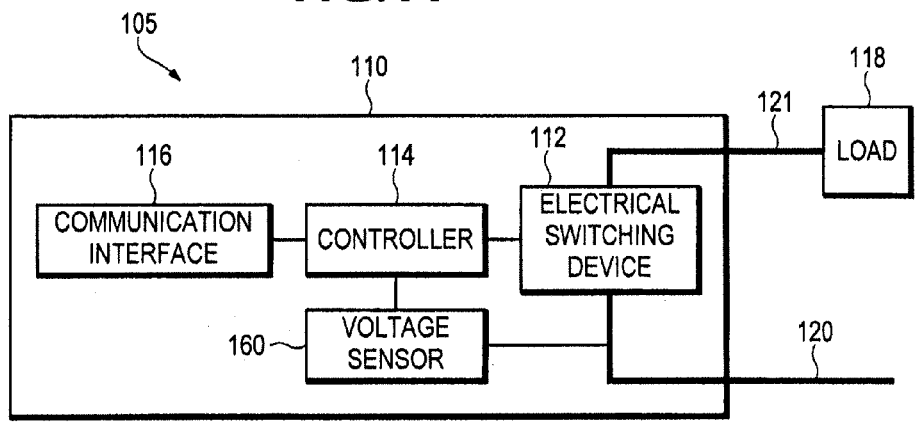
FIG. 12 illustrates an embodiment of an electrical switching module with a voltage sensor according to some inventive principles of this patent disclosure.

FIG. 12 illustrates an embodiment of an electrical switching module with a voltage sensor according to some inventive principles of this patent disclosure. In this embodiment, the module 105 includes a voltage sensor 160. The voltage sensor 150 is coupled to the electrical switching device 112. The voltage sensor 150 can be configured to sense a voltage associated with the electrical switching device 112. For example, as illustrated, the voltage sensor 160 can be configured to sense a voltage on line wiring 120 coupled to the electrical switching device 112. Alternatively, the voltage sensor can be configured to sense a voltage on the load wiring 121, a power supply for driving the actuation of the electrical switching device 112, or the like. The voltage sensor 160 can be configured to sense any voltage associated with the electrical switching device 112.

The voltage sensor 160 can include any variety of voltage sensors. For example, the voltage sensor 160 can be single ended or differential. The voltage sensor 160 can sense direct current (DC) or alternating current (AC) voltages. The voltage sensor 160 can have a single input or multiple inputs.

In another embodiment the voltage sensor 160 can include conditioning circuitry to transform the monitored voltage into a voltage suitable for digitizing by the module controller 114. For example, the voltage sensor 160 can include rectification and scaling to transform a 120 VAC voltage into a 2.5 VDC voltage, or the like. Accordingly, an analog to digital converter of the module controller 114 can sense the 2.5 VDC voltage.

In an embodiment, the sensing of various voltages, currents, and the like within the case 110 of the module can allow power measurement at a module level resolution. For example, multiple modules can be installed within a load center, electrical cabinet, or the like. Each module can monitor the current and voltage associated with the electrical switching device 112. Accordingly, the power delivered to each load 118 can be monitored. The module controller 114 can be configured to monitor such measurements, record such measurements, report the measurements to a system master or user, report the measurements to the central controller 30, or the like. Accordingly, the central controller 30 can monitor power demand and/or consumption with individual monitor resolution as well as individually controlling the electrical switching devices 112 associated with individual modules or groups of modules.

Figure 13:
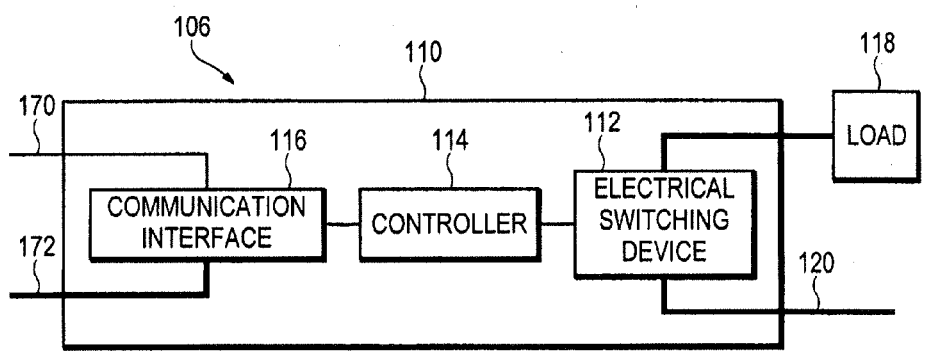
FIG. 13 illustrates an embodiment of an electrical switching module with a communication interface according to some inventive principles of this patent disclosure.

FIG. 13 illustrates an embodiment of an electrical switching module with a communication interface according to some inventive principles of this patent disclosure. In this embodiment, the communication interface 116 is coupled to a terminal 170. The communication interface 116 is also coupled to communication terminals 172. The communication terminals include terminals over which communication signals are transmitted.

In this embodiment, the terminal 170 is separate from the communication terminals 172. When installed in a mounting site, a voltage can appear on the terminal 170. The voltage can correspond to a parameter of the communication interface. For example, the voltage can correspond to an address associated with the communication interface.

In an embodiment, each mounting site for a module 106 within a cabinet, panel, or other enclosure can have a different voltage appear at a connection for the associated terminal 170. The module controller 114 can be configured to determine an address for the module 106 in response to the voltage. Thus, each module 106 can have a unique address resulting from a unique voltage. As a result, substantially identical modules 106 can be installed in substantially identical mounting sites within an enclosure yet each module can be addressed individually.

Although a voltage has been described as being present on the terminal, another aspect of the terminal can be used. For example, a current, an AC amplitude, a digital signal, or the like can be sensed.

Although a single terminal 170 has been described multiple terminals 170 can be used. For example, a cabinet can be divided into multiple regions with each region including mounting sites for multiple modules. A first terminal 170 can be used as described above to determine a first voltage. A second terminal 170 can be used to determine a second voltage. The combination of the two voltages can be used to select a unique address. In another example, the states of eight terminals 170 can form an eight bit value for use in determining an address. Any number of terminals 170 can be used to detect any number of signals to define the parameters of the communication interface 116.

Although an address has been used as an example of a parameter for a communication interface 116, a parameter can include other aspects of the communication interface 116. For example, a parameter can include a type of communication network, a master/slave indication, or the like.

Although the communication interface 116 has been illustrated in each of FIGS. 8-13, a module need not have a communication interface 116, yet can still have the various other circuitry and functionality described above. For example, the various circuitry described above can be used in monitoring an electrical switching device for a fault. Such a fault, the underlying information generating the fault, or the like can, but need not, be communicated through a communication interface. Rather, such a fault can be communicated to a user through a different user interface. For example, the state of a manual actuator can be changed to indicate the fault. In another example, another user interface within the module, such as a light emitting diode (LED) can be illuminated to indicate the fault, the type of fault, or the like. Moreover, a fault need not be the only state communicated through such a user interface.

Accordingly, the module can act as a stand alone module without any external processing monitoring, or the like. Information about the module, the electrical switching device 112, or the like can be provided to a user beyond mere on, off, and tripped states, or the like.

Figure 14:
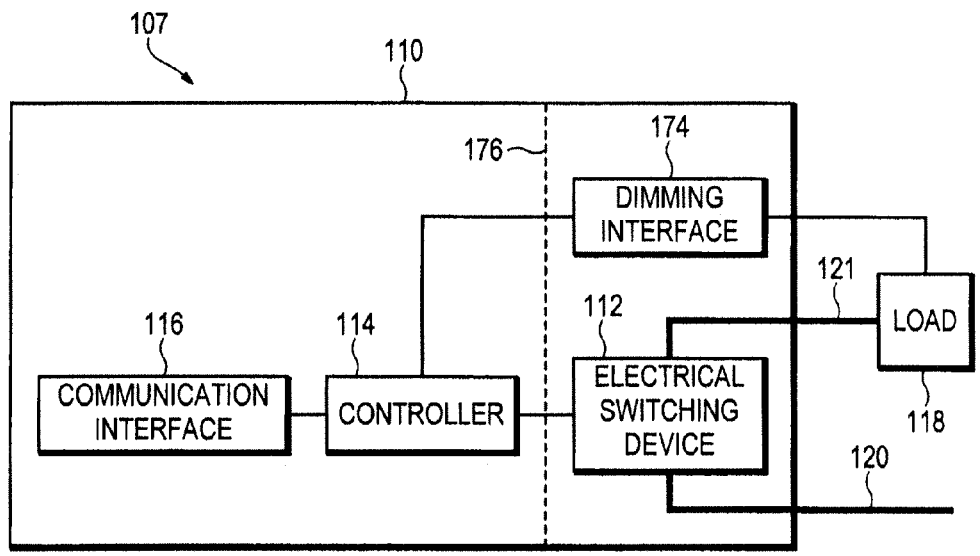
FIG. 14 illustrates an embodiment of an electrical switching module with a dimming interface according to some inventive principles of this patent disclosure.

FIG. 14 illustrates an embodiment of an electrical switching module with a dimming interface according to some inventive principles of this patent disclosure. In this embodiment, the module 107 includes a dimming interface 174. The dimming interface 174 can be any variety of dimming interfaces. For example, the dimming interface 174 can be a digital addressable lighting interface (DALI), a 0-10V load interface, a digital signal interface (DSI), or any other interface for dimming control.

In addition, in an embodiment, the dimming interface can be disposed in a region of the module 107 along with the electrical switching device 112. For example, the electrical switching device 112 can be wired as a class 1 device. The dimming interface 174 can also be wired as a class 1 device even though it has an interface to the module controller 114. That is, even though the module controller 114 is disposed in a region of the module, such as a class 3 region, the connection to the dimming interface 174 across the boundary 176 can be formed such that the electrical regions are appropriately isolated.

In an embodiment, the central controller 30 can communicate with the module controller 114 through the communication interface 116 and direct operation of the dimming interface 174. In this way, the central controller 30 can manage the power consumption of multiple lights in the building 10 as described above. By being able to control individual modules and receiving power demand data from individual modules, the central controller 30 is better able to adjust individual loads in the building 10 and thus to control power demand and/or consumption for the building 10.

Although a variety of individual elements of a module have been described above, a given module can include any combination of such elements. Moreover, any variety of different modules can be used in concert as the communication interface 116 can be configured to allow the module controller 114 to be interrogated for its capabilities and to allow the central controller 30 to direct the operation of the modules. Further, although the modules have been described in the context of lighting loads, any type of load can be monitored and controlled by the central controller 30 through the module including, for example, HVAC components, light sensors, electrical outlets, and the like. Accordingly, the central controller 30 can monitor and control individual loads and groups of loads throughout the building 10 on a real-time basis using individual modules.

Figure 15:
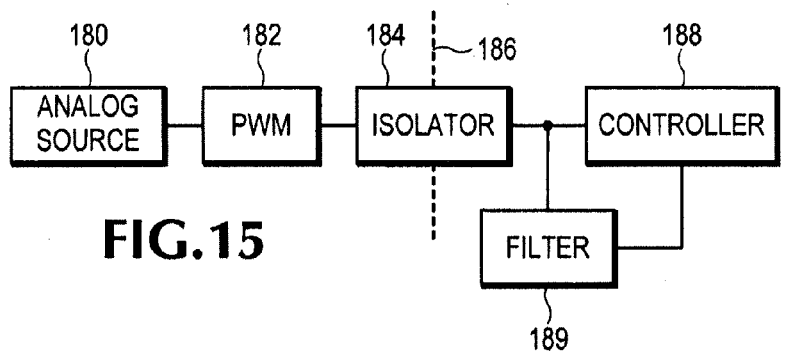
FIG. 15 illustrates an analog signal measurement circuit capable of signal transmission across a voltage boundary according to some inventive principles of this patent disclosure.

FIG. 15 illustrates an analog signal measurement circuit capable of signal transmission across a voltage boundary according to some inventive principles of this patent disclosure. As described above, a variety of voltages, currents, signals, or the like can be monitored in a module and reported to a central controller 30. Such parameters can be transformed into an analog signal suitable for communication. For example, an amplitude of a 120 VAC signal can be converted into a 2.5 VDC signal. The analog source 180 represents such circuitry, coupling, or the like to obtain such a signal.

Once obtained, the analog signal can be used to modulate a pulse width. Pulse width modulated (PWM) signal generator 182 can be configured to generate a PWM signal having a pulse width corresponding to the analog signal. For example, the pulse width can correspond to a voltage measured by a voltage sensor 160, current sensor 150, described above, or the like.

An isolator 184 can span a boundary 186 between a first voltage region and a second voltage region. For example, a class 1 region and a class 3 region can be separated by the boundary 186. The isolator can allow a signal to cross the boundary, yet maintain the isolation. The isolator 184 can be any variety of isolator. For example, an optoisolator, a transformer, or the like can be used as an isolator 184.

The PWM signal can be propagated across the boundary 186 through the isolator. In particular, as the information contained within the PWM signal is the pulse width, a variation in amplitude of the PWM signal has a reduced if not negligible effect on a quality of the transmitted signal. However, any aging, degradation, or the like of the isolator 180 can have a reduced effect on the recovered analog signal.

In this embodiment, a controller 188 and a filter 189 are both illustrated as receiving the PWM signal. Thus, the filter 189 can be configured to filter the PWM signal to another analog signal. In an embodiment, the recovered analog signal can, but need not, be substantially identical to the original analog signal. That is, the recovered analog signal can be scaled differently, include an offset, or the like.

In addition, the controller 188 can receive the PWM signal. As will be described in further detail below, additional information beyond the analog signal can be communicated through the PWM signal. However, the controller 188 can also be configured to recover the analog signal from the PWM signal. For example, the controller can be configured to measure a pulse width of the PWM signal. Thus, the encoded analog signal can be recovered.

Figure 16:
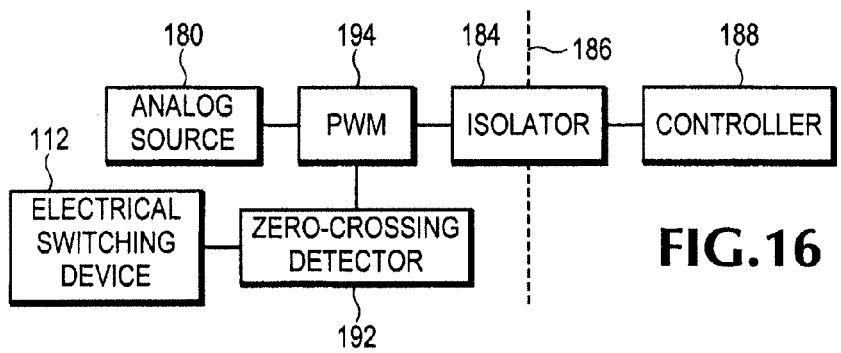
FIG. 16 illustrates the circuit of FIG. 8 with a zero-crossing detector according to some inventive principles of this patent disclosure.

FIG. 16 illustrates the circuit of FIG. 15 with a zero-crossing detector according to some inventive principles of this patent disclosure. In this embodiment, the PWM signal generator 194 is coupled to a zero-crossing detector 192. The zero-crossing detector 192 is configured to detect a zero-crossing associated with an electrical switching device 112.

The PWM signal generator 194 is configured to generate a PWM signal having a pulse width corresponding to the analog signal. However, the PWM signal generator 194 is also configured to generate a PWM signal in response to the zero-crossing detector 192. For example the PWM signal can be substantially synchronized with zero-crossings detected by the zero-crossing detector 192. Thus, the PWM signal that is propagated through the isolator 184 has two distinct sets of information encoded within. That is, the analog signal and the zero-crossings are encoded in a single PWM signal.

In particular, in an embodiment the time of the zero-crossing can be represented by an edge of the PWM signal. For example, each rising edge can be substantially coincident with a zero-crossing However, in an embodiment, the detected zero-crossing can be offset in time, phase, or the like from the actual zero-crossing. Accordingly, the PWM signal can be adjusted, the processed PWM signal can be adjusted, or the like to identify the actual zero-crossing.

As described above, the controller 188 can be configured to sense the analog signal within the PWM signal. In addition, the controller 188 can be configured to sense a zero-crossing from the PWM signal. For example, the controller 188 can include an edge triggered interrupt responsive to rising edges. Thus, the controller 188 can receive an interrupt for each zero-crossing.

Figure 17:
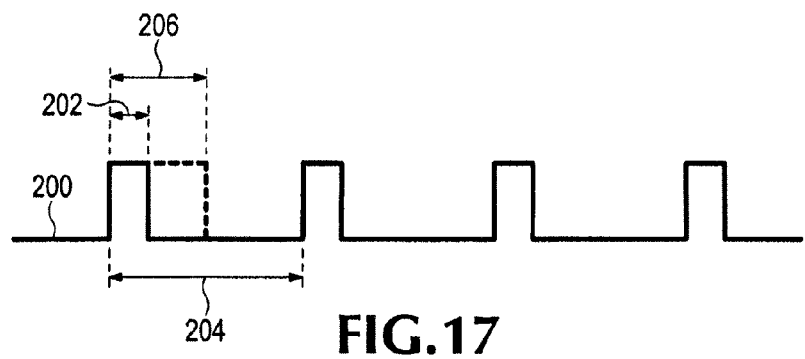
FIG. 17 illustrates a pulse width modulated pulse train synchronized with a zero-crossing according to some inventive principles of this patent disclosure.

FIG. 17 illustrates a pulse width modulated pulse train synchronized with a zero-crossing according to some inventive principles of this patent disclosure. The pulse train 201 has a series of pulses having a width 202. The pulses occur with a period 204. As described above, the pulse width can encode an analog signal. Pulse width 206, illustrated in phantom, illustrates a different pulse width corresponding to a different level of the analog signal.

As illustrated the pulse with width 202 and the pulse with width 206 share a common rising edge. Thus, regardless of the pulse width, assuming it is not substantially 0% or 100% of the period 204, a rising edge can occur substantially coincident with the zero-crossing. That is, the period 204 can convey a separate piece of information, such as the zero-crossing described above.

In an embodiment, multiple zero-crossings can be communicated through multiple PWM signals. Although a single zero-crossing detector 192 has been described above, the zero-crossings detected by the zero-crossing detector 192 can, but need not, be the only zero-crossings detected. For example, a zero-crossing of a current through electrical switching device 112 may be out of phase with a zero-crossing of a voltage coupled to the electrical switching device 112.

Accordingly, a first PWM signal can be substantially synchronized with a first zero-crossing signal. A second PWM signal can be substantially synchronized with a second zero-crossing signal. Thus, any number of different zero-crossing signals can be communicated across a voltage region boundary as desired.

Although the PWM signal has been described as substantially synchronized with zero-crossings, such synchronization can, but need not, include substantially similar frequencies. For example, a voltage zero-crossing can occur in a 60 Hz signal at 120 Hz. However, the PWM signal can be synchronized to 60 Hz, 30 Hz, or the like. Similarly, the PWM signal can be synchronized to a higher frequency, such as 240 Hz, 480 Hz, or the like. However, in such circumstances, an additional signal may be used to determine which edges of the PWM signal are substantially coincident with a zero-crossing.

Figure 18:
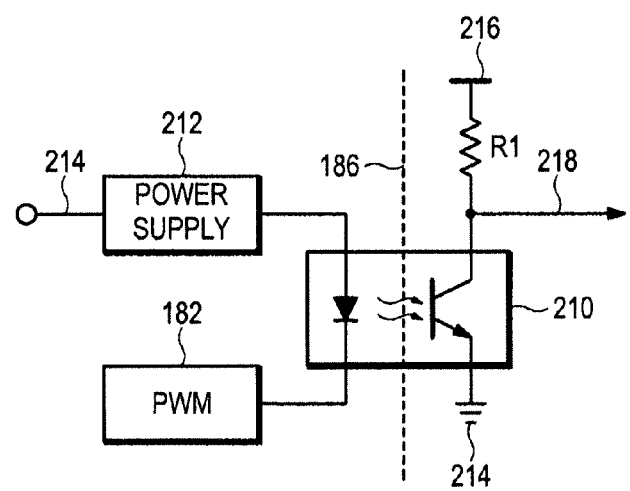
FIG. 18 illustrates a circuit spanning a voltage region boundary according to some inventive principles of this patent disclosure.

FIG. 18 illustrates a circuit spanning a voltage region boundary according to some inventive principles of this patent disclosure. In this embodiment, the isolator is an optoisolator 210 with a photodiode and a phototransistor. The photodiode is coupled between a power supply 212 and a PWM signal generator 182. Accordingly, the photodiode can be switched on and off according to a PWM signal.

The phototransistor is coupled to a resistor R and a ground 214. The resistor R is coupled to a power supply 216. As the phototransistor is alternately turned on an off by the actuated photodiode, the node 218 is alternately pulled up by the resistor R and pulled down by the phototransistor. Thus, the PWM signal can be propagated across the boundary 186. Although in this embodiment, the PWM signal that is propagated corresponds to the generated PWM signal, the components, connections, or the like can be selected such that the PWM signal on node 218 can be inverted when crossing the boundary 186.

In an embodiment, the power supply 212 can receive a line voltage from a line terminal 213. The power supply 212 can be configured to generate a power voltage for the photodiode of the optoisolator. The photodiode of the optoisolator 210 can have a threshold voltage below which the photodiode will not substantially actuate the optoisolator 210. The power supply 212 can be configured such that at a minimum specified voltage of the line voltage, the power voltage is substantially equal to the threshold voltage of the photodiode. That is, if the line voltage is below the minimum specified voltage, the power voltage will be below the threshold voltage of the photo diode. As a result, a relatively smaller amount of current will be drawn from the power supply 212 than in operation. Thus, the current consumed by the circuit can be reduced until the minimum specified voltage has been met or exceeded.

Figure 19:
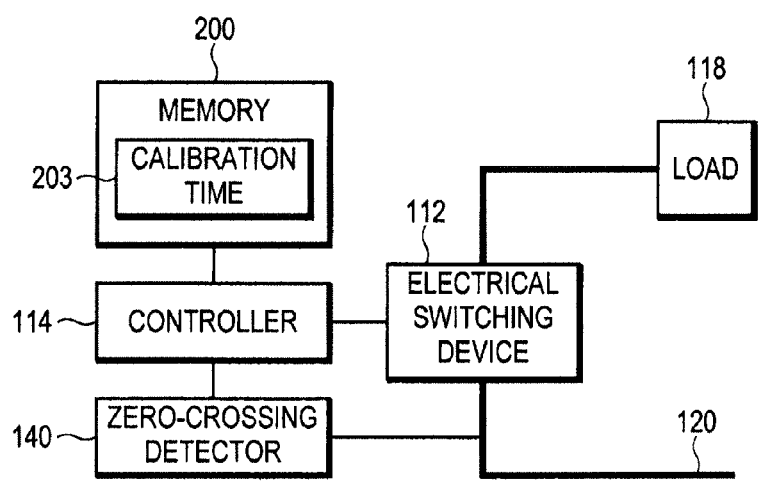
FIG. 19 illustrates a zero-crossing synchronization circuit according to some inventive principles of this patent disclosure.

FIG. 19 illustrates a zero-crossing synchronization circuit according to some inventive principles of this patent disclosure. In this embodiment, the module controller 114 is coupled to a memory 200. The memory is configured to store a calibration time 203. The memory 200 can be any variety of memory. For example, the memory can be non-volatile or volatile memory, static or dynamic memory, or the like. Moreover, the memory 200 can be internal to the module controller 114, external, or a combination.

As described above, the module controller 114 can be coupled to a zero-crossing detector 140 and receive a zero-crossing. The module controller 114 can be configured to actuate the electrical switching device 112 in response to the zero-crossing detector and a calibration time. The calibration time 203 can be a variety of different times. For example, the calibration time 203 can be an actuation time, an offset from an actuation time, a delay between a zero-crossing and an energization time, or the like.

Figure 20:
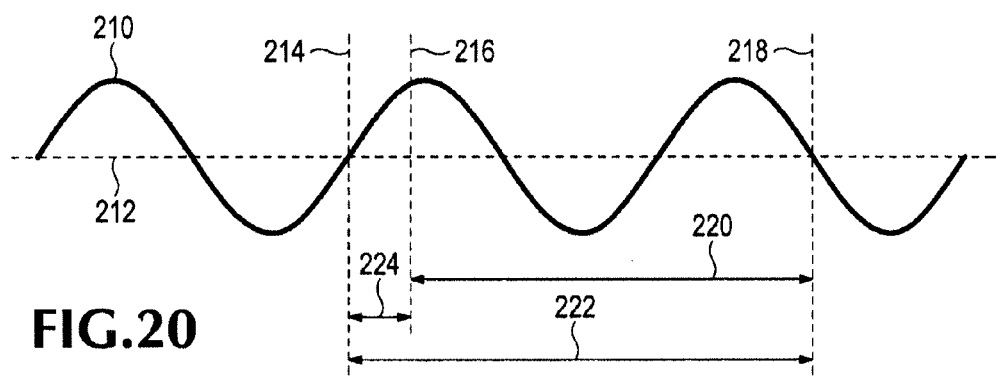
FIG. 20 illustrates an example of a timing of an actuation of the electrical switching device relative to zero-crossings of a waveform according to some inventive principles of this patent disclosure.

FIG. 20 illustrates an example of a timing of an actuation of the electrical switching device relative to zero-crossings of a waveform according to some inventive principles of this patent disclosure. In this embodiment, reference line 212 represents the zero level associated with waveform 210. The waveform 210 can represent the parameter having the zero-crossing, such as a voltage or current.

In this embodiment, time 220 is an actuation time 220. For example, the stored calibration time 203 can be the actuation time 220. The delay time 224 was calculated such that a total of the actuation time 220 and the delay time 224 was substantially equal to an integer multiple of the zero-crossing period. In this embodiment, the total time period 222 is substantially equal to three zero-crossing periods.

The module controller 114 is configured to receive a zero-crossing, such as zero-crossing 214. The module controller 114 does not actuate the electrical switching device 112 until a delay time 224 after the zero-crossing 214. In particular the electrical switching device 112 is actuated at time 216. The electrical switching device 112 takes time 220 to actuate such that the actuation is not substantially complete until time 218. Since the total time 222 including the delay time 224 and the actuation time 220 was an integer multiple of the zero-crossing period and the total time 222 began substantially at a zero-crossing at time 214, the completion of the actuation will occur substantially at the zero-crossing at time 218, three zero-crossing time periods from the zero-crossing at time 214. Thus, the actuation of the electrical switching device 112 can be substantially synchronized with a zero-crossing.

Although a single zero-crossing sequence has been described as being used to actuate the electrical switching device 112, different zero-crossing sequences can be used for different operations of the electrical switching device 112. For example, a zero-crossing sequence for the voltage of the line wiring 120 can be used when actuating the electrical switching device 112 to close the contacts of the electrical switching device 112. Thus, as the contacts are closed, the voltage drop across the contacts can approach a minimum. When the contacts of the electrical switching device 112 are to be opened, the opening can be substantially synchronized with the zero-crossings of the current flowing through the electrical switching device 112.

Figure 21:
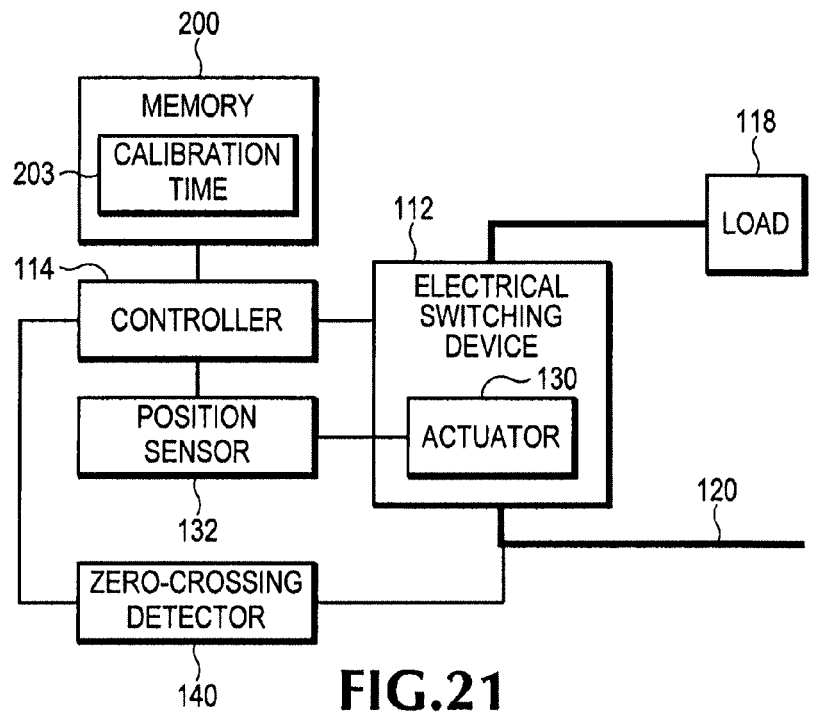
FIG. 21 illustrates another zero-crossing synchronization circuit according to some inventive principles of this patent disclosure.

FIG. 21 illustrates another zero-crossing synchronization circuit according to some inventive principles of this patent disclosure. In this embodiment, the module controller 114 is configured to measure a delay time between an energization of the electrical switching device and an actuation of the electrical switching device.

In this embodiment, a position sensor 132 is configured to sense a state of the electrical switching device 112. For example, as described above, the position sensor 132 can sense a position of the actuator 130. As a result, the state of the electrical switching device 112 can be sensed. However, in another embodiment, other techniques can be used to sense the state of the electrical switching device 112. For example, an instantaneous voltage across the electrical switching device 112, a current passing through the electrical switching device, or the like can be used to sense the state.

The module controller 114 can be configured to measure a delay time between an energization of the electrical switching device 112 and a change in the state sensed by the position sensor 132. As a result, the actuation time can be determined. The actuation time can be used to update the calibration time 203. Thus, a different delay time 224, different actuation time 220, or the like can be stored as the calibration time 203.

Figure 22:
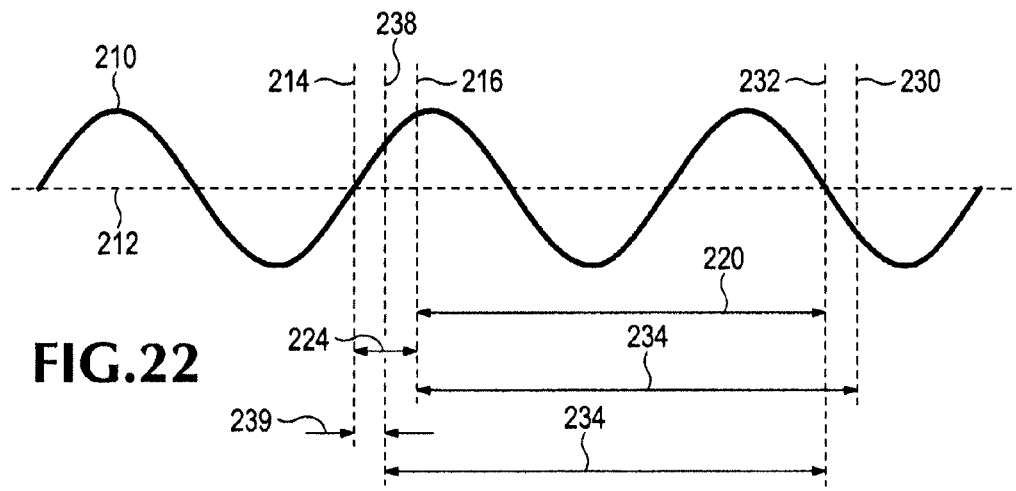
FIG. 22 illustrates an example of a measurement of an actuation time of the electrical switching device relative to zero-crossings of a waveform according to some inventive principles of this patent disclosure.

FIG. 22 illustrates an example of a measurement of an actuation time of the electrical switching device relative to zero-crossings of a waveform according to some inventive principles of this patent disclosure. Delay time 224 and actuation time 220 are illustrated for reference. However, in this embodiment, the actuation time of the electrical switching device 112 has changed to 234. That is, the electrical switching device 112 is energized at time 216 after the delay time 224. The electrical switching device 112 is actuated by the actuation time 234 at time 230, after the zero-crossing at time 232. Thus, because the actual actuation time 234 is different, the actuation does not occur on the desired zero-crossing at time 232.

However, as described above, the actuation time of the electrical switching device 112 can be measured. That is, by detecting the time between the energization at time 216 and the actual actuation at time 230, a new actuation time 234 can be determined. Accordingly, the delay time 224 can be adjusted such that a total of the new delay time 239 and the recently measured actuation time 234 can be substantially equal to an integer multiple of a zero-crossing period. That is, the new delay time 239 can be updated, the actuation time 236 can be updated, or the like.

In an embodiment, the actuation time can be measured whenever the electrical switching device 112 is actuated. Accordingly, the time delay 239 can be calculated in response to recent measurements. Moreover, as the electrical switching device 112 is actuated, multiple measurements of the actuation time 236 can be obtained. Using the multiple measurements, a variation of the actuation time can be determined. As with any measurement technique, some variation may be present. However, variation greater than or equal to a threshold can be identified within the multiple measurements.

For example, the variation can be an erratic variation with substantially unpredictable actuation times. If the magnitude of the variation crosses the threshold, the variation can be reported by the module controller 114, a fault can be indicated, the module controller 114 can open the electrical switching device 112, or the like. In other words, the measured actuation time 236 can be used for any purpose beyond adjustment of the calibration time for the module.

In another example, the actuation time can be increasing monotonically. Such a change can be an indication of aging, but may not indicate that the electrical switching device 112 is failing, operating in an unsafe manner, or the like. The module controller 114 can be configured to analyze the various actuation times to make such a determination.

In an embodiment, the difference between a new actuation time, such as time 234, and an earlier actuation time, such as time 220, can be greater than the earlier delay time 224. That is, the new time 234 can exceed the integer multiple of zero-crossings of the total of the delay time 224 and the earlier actuation time 220. Accordingly, the new delay time 239 can be selected for a different integer multiple of zero-crossing periods. That is, a greater number of zero-crossing periods can be included in the total time. Similarly, if the measured actuation time 236 is sufficiently less, a reduced number of zero-crossing periods can be included in the total.

Moreover, in an embodiment, the number of zero-crossing periods used as the total of the delay time 239 and the actuation time 236 need not be the minimum number. For example, as illustrated, three zero-crossing periods are included in the total of the delay time 239 and the actuation time 236. However, the delay time 239 could be set such that four or more zero-crossing periods can be included. That is, the delay time 239 can be, but need not be a fraction of a single zero-crossing period.

As described above, a single zero-crossing has been described with respect to the timing and measurement of energization and actuation. However, different calibration times, zero-crossings, delay times, or the like can be used according to the associated actuation. For example, an actuation of the electrical switching device 112 to close the contacts can use the voltage zero-crossings with an associated voltage zero-crossing calibration time. An actuation of the electrical switching device 112 to open the contacts can use the current zero-crossings with an associated current zero-crossing calibration time, both of which may be different from the corresponding voltage related parameters.

Figure 23:
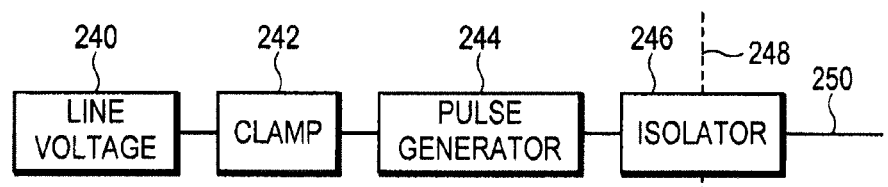
FIG. 23 illustrates a zero-crossing detector according to some inventive principles of this patent disclosure.

FIG. 23 illustrates a zero-crossing detector according to some inventive principles of this patent disclosure. In this embodiment, a clamp 242 is configured to clamp an alternating current (AC) signal. For example, the AC signal can be the line voltage 240 on line wiring. However, in other embodiments, the AC signal can be different, for example, the current flowing through the electrical switching device 112, or the like.

A pulse generator 244 is coupled to the clamp 242 and configured to generate a pulse in response to an edge of the clamped AC signal. An isolator 246 is coupled to the pulse generator 244 and configured to be actuated by the pulse. Accordingly, the pulse from the pulse generator can be propagated across the voltage boundary 248 to generate a pulse on line 250.

In particular, as the AC signal is clamped, the clamped AC signal can transition during low voltage portions of the AC signal. For example, as the AC signal crosses through approximately zero volts, the clamped AC signal can also transition. Thus, the transitions, or edges of the clamped AC signal correspond to the zero-crossings.

In an embodiment, the information conveyed in the pulses is conveyed in the edge. Accordingly, a minimum pulse width sufficient to be detected can be used. For example, a pulse width of about 100 µs can be used. As a result, the isolator 246 can be configured to be actuated for only about 100 µs. Thus, with a 120 Hz zero-crossing frequency, corresponding to a period of about 8.3 ms, a 100 µs pulse width is a duty cycle of about 1.2%. Accordingly, for a majority of the time of a zero-crossing period, the isolator 246 can be disabled. In particular, with an optoisolator described above, the photodiode can be disabled for the majority of the zero-crossing period.

As a result, a power consumption of the circuit can be reduced. For example, if the clamped AC signal is used to turn the photodiode on and off, a duty cycle of about 50% is achieved. Thus, the photodiode is on for about 50% of the time. In contrast, if a 1.2% duty cycle as described above, the photodiode is turned on only about 1.2% of the time, yet the same zero-crossing information is conveyed. That is, the zero-crossing information can be obtained with a reduced amount of power.

In particular, the reduction in power can occur with respect to a power supply generated from the line voltage. For example, the power supply for the photodiode actuation can be generated from a line voltage. An amount of current that is allowed to be sunk to a neutral terminal can be limited. Accordingly, a minimum power consumption can be achieved, reducing power consumption, leaving more power for other devices, or the like.

Figure 24:
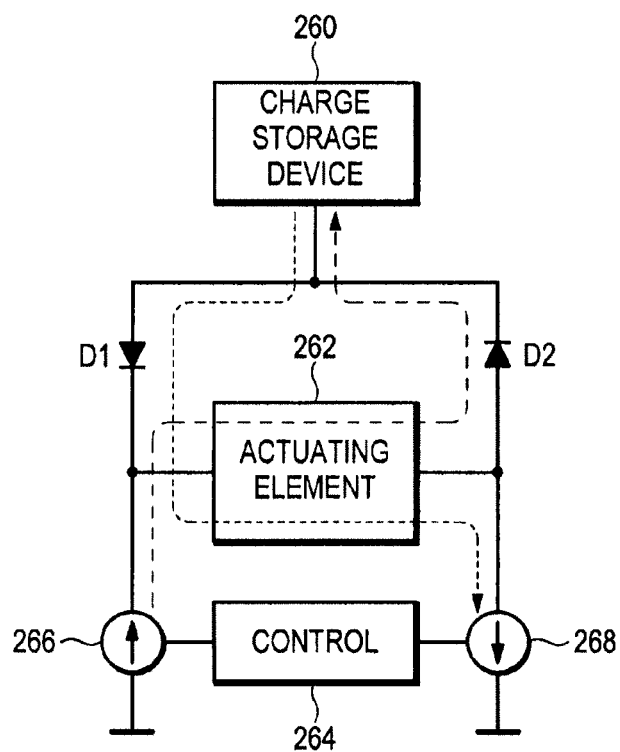
FIG. 24 illustrates an example of the pulse generator of FIG. 16 according to some inventive principles of this patent disclosure.

FIG. 24 illustrates an example of the pulse generator of FIG. 23 according to some inventive principles of this patent disclosure. In this embodiment, a charge storage device 260 is configured to store a charge. The charge storage device 260 can include a capacitor, inductor, or the like. The charge storage device 260 can also include various other components, such as resistors, current limiters, or the like such that the charge and discharge time can be set as desired.

The charge storage device 260 is coupled to diodes D1 and D2. The diodes D1 and D2 are coupled to the charge storage device 260 in opposite directions. Thus, current flowing towards and away from the charge storage device 260 can take substantially different paths as illustrated by paths 261 and 263.

The diodes D1 and D2 are coupled to the actuating element 262 of the isolator 246. For example, the actuating element 162 can be the photodiode of the optoisolator described above. In particular, the diodes D1 and D2 can be coupled to the actuating element 262 such that the current paths 261 and 263 each flow the same direction through the actuating element 262. That is, even though the paths 261 and 263 are substantially different, the paths 261 and 263 share the same path through the actuating element 262.

Controllable current sources 266 and 268 are responsive to the control 264. The control 264 represents the driving circuitry that sources or sinks the current of the paths 261 and 263. In particular, the current sources 266 and 268 are not ideal sources. That is the current that is sourced or sunk can fall as the charge storage device 260 is charged or discharged.

The control 264 is configured to drive the current sources in response to the clamped AC signal from the claim 242. That is, as described above, the clamped AC signal can be a square wave signal with about a 50% duty cycle. The current sources 266 and 268 can be configured to be alternately activated in response to the different states of the clamped AC signal. Thus, the charge storage device 260 can be charged and discharged in response to the states of the clamped AC signal.

As described above, the current sources 266 and 268 are non-ideal sources. In particular, the current sources 266 and 268 are each configured to charge or discharge the charge storage device 260 to a corresponding rate. As the charge rate defines the time that the charge storage device 260 takes to charge or discharge, and effectively disable the corresponding current source 266 to 268, the time that the actuating element 262 is actuated can be controlled. As described above, regardless of the direction of charging or discharging of the charge storage device 260, the current passes through the actuating element 262 in the same direction. Thus, the actuating element 262 will be actuated substantially during the charging or discharging operation. However, the current can drop below a threshold to activate the actuation element 262 during a steady state condition. Thus, a pulse can be generated with a finite width.

Moreover, as the control of the current source 266 and 268 changes as the clamped AC signal changes, a new charge or discharge cycle will begin on each change of state. As described above, with the clamped AC signal, the transitions can correspond to a zero-crossing. Thus, a new charge or discharge cycle will begin on the zero-crossing, and hence, the actuating element 262 will be actuated on the zero-crossing. The time the actuating element 262 is actuated will be dependent on the charge or discharge time of the charge storage device 260.

Figure 25:
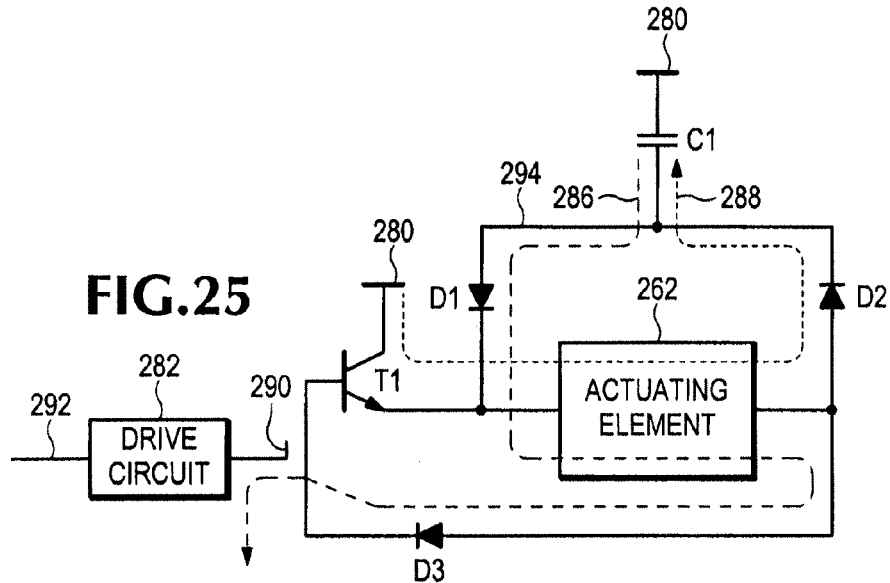
FIG. 25 illustrates another example of the pulse generator of FIG. 16 according to some inventive principles of this patent disclosure.

FIG. 25 illustrates another example of the pulse generator of FIG. 23 according to some inventive principles of this patent disclosure. In this embodiment, the charge storage device 260 is a capacitor C1. The capacitor C1 is coupled between the diodes and the power supply 280. Although a single power supply 280 connection is illustrated, the capacitor C1 can represent capacitance to more than one reference voltage.

A first terminal of the actuating element 260 is coupled to a transistor T1. Transistor T1 is coupled to power supply 280 and configured to receive a control output from the drive circuit 282 at a common node 290. The drive circuit 282 includes any circuitry to condition the clamped AC signal 292 appropriately to drive the common node 290.

A second terminal of the actuating element 262 is coupled to a diode D3. Diode D3 is also coupled to the common node 290. In this embodiment, when the control output at the control node 290 is a low signal, current is conducted along path 286, charging the capacitor 280 and pulling down node 294. During this time, the actuating element 262 is actuated in response to the current. Eventually, node 294 will be pulled down sufficiently such that the voltage drop across the various components along the path 286 and, in particular, the actuating element 262, will be insufficient to actuate the isolator 246. Thus, the actuating element 262 will be actuated substantially only for such a time period.

When the control node 290 is driven with a high signal, transistor T1 conducts. Diode D3 is substantially reversed biased and does not conduct. Thus, current flows along path 288, pulling up node 294, reducing the charge on the capacitor C1. Similarly, the transistor T1 will pull up node 294 until the voltage drop is insufficient. Again, the actuating element 262 is actuated for the time node 294 is pulled up.

Although in this embodiment, a transistor T1 and diode D3 have been described, other circuitry can be used to drive the terminals of the actuating element 262. For example, transistor T1 could be replaced with a diode and the drive circuit 282 can be configured to supply the current for path 288. Moreover, although the terms pull up and pull down have been used above, the circuitry, charge storage element 260, or the like can be configured where the flow of current, control, or the like is reversed.

Figure 26:
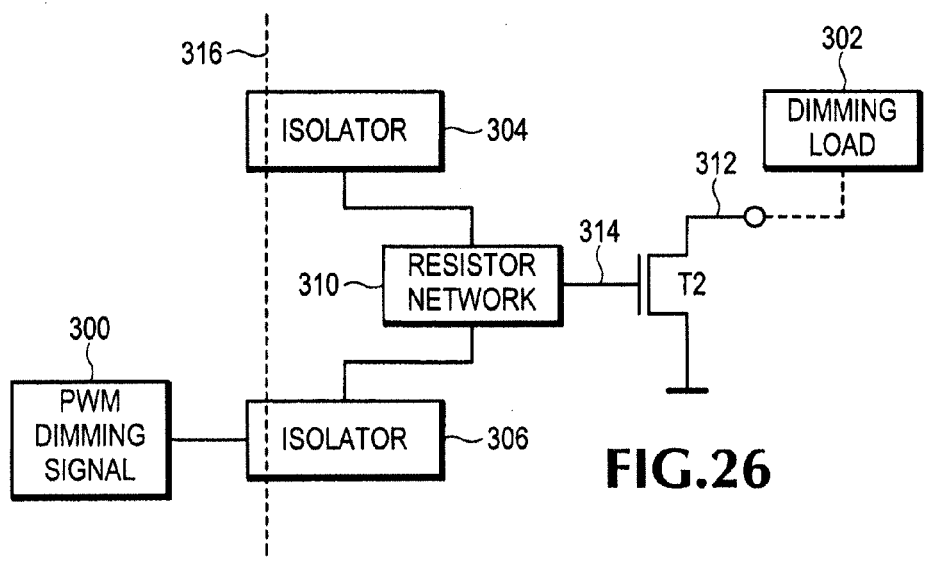
FIG. 26 illustrates a dimming control circuit according to some inventive principles of this patent disclosure.

FIG. 26 illustrates a dimming control circuit according to some inventive principles of this patent disclosure. In this embodiment, the circuit is actuated by a PWM dimming signal 300. For example, the desired level of dimming can be set by the pulse of the PWM dimming signal 300. The PWM dimming signal 300 is applied to the isolator 306. The isolator 306 bridges the boundary 316 between voltage regions. In an embodiment, the PWM dimming signal can be located on a low voltage side of the boundary 316.

The isolator 306 is coupled to a resistor network 310. The resistor network 310 is also coupled to an isolator 304 and a control node 314 coupled to a control input of a transistor T2. In an embodiment, the isolators 304 and 306 can be configured to be substantially non-conducting when a power supply is disabled. For example, as will be described in further detail below, the power supply can be a power supply in the low voltage region. Thus, the isolators 304 and 306 can be substantially non-conducting when the low voltage region power supply is disabled. In particular, the PWM dimming signal 300 can be generated by circuitry also powered by the low voltage power supply. Accordingly, the isolators 304 and 306 can be configured to be substantially non-conducting when the PWM dimming signal is not a valid signal.

The isolators 304 and 306 can be coupled to the resistor network 310 such that when the isolators 304 and 306 are substantially non-conducting, the direct current (DC) current paths associated with the control node 314 are substantially non-conducting. In particular, as described above, the isolators 304 and 306 can be substantially non-conducting when the low voltage power supply is disabled. As a result, the voltage on the control node 314 can remain substantially the same.

In this embodiment, the dimming circuit is configured to drive a dimming load 302 through output port 312. The dimming load 302 can be a pull-up style of load where the control is varied by varying the current pulled through the transistor T2. In particular the current can be varied by controlling the control node 314.

As described above, when the low voltage power supply is disabled, the control node 314 can remain at substantially the same level. As a result, the current pulling down the output port 312 can remain at substantially the same level. Thus the dimming load 302 can receive substantially the same signal even though a power supply associated with the PWM dimming signal 300 has been disabled.

Figure 27:
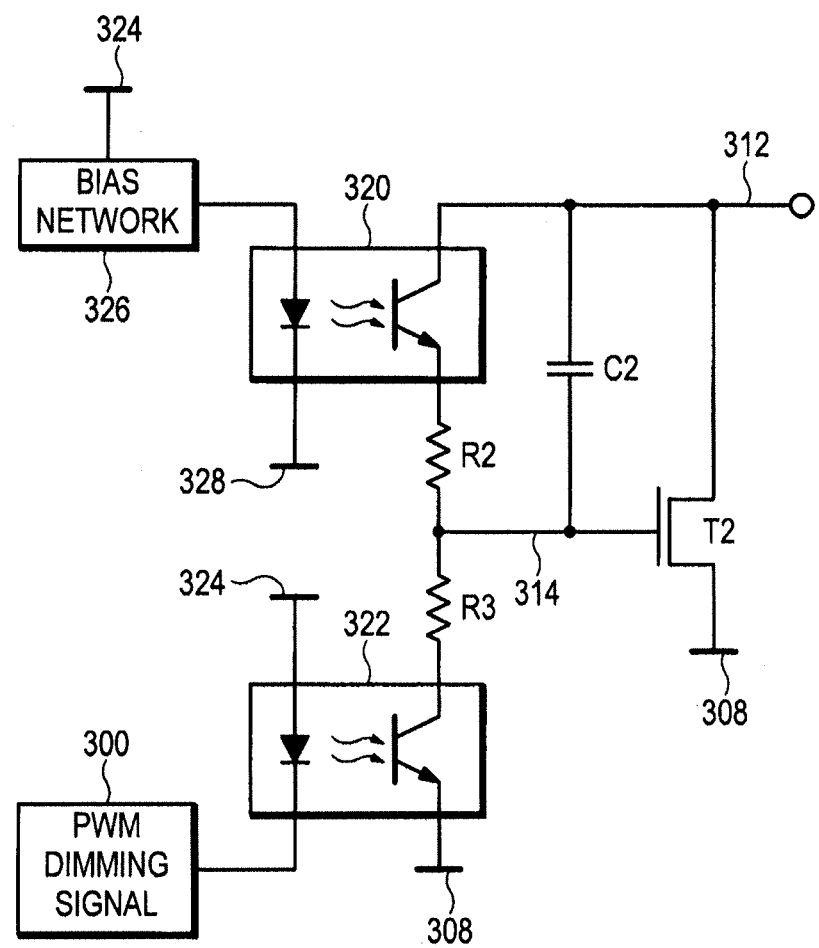
FIG. 27 illustrates another dimming control circuit according to some inventive principles of this patent disclosure.

FIG. 27 illustrates another dimming control circuit according to some inventive principles of this patent disclosure. In this embodiment optoisolator 320 is coupled between a bias network 326 and the power supply terminal 328. The bias network 326 is coupled to the power supply terminal 324. Accordingly, when the power supply is disabled, the voltage drop between the power supply terminals 324 and 328 will not be sufficient to actuate the photodiode, and hence, the phototransistor.

Similarly, the optoisolator 322 is coupled to power supply terminal 324 and driven by the PWM dimming signal 300. When the power supply is disabled, the optoisolator 322 will similarly be disabled. Although a bias network 326 has been illustrated for only the optoisolator 320, a similar bias network could be used for optoisolator 322. Moreover, the power supply 324 can supply a bias to the optoisolator 322 such that it can respond to the PWM dimming signal 300. Regardless, when the power supply is disabled, the optoisolators 320 and 322 can be configured to become substantially non-conducting.

In this embodiment, resistors R2 and R3 form a resistor network coupled to control node 314. A capacitor C2 is coupled between the control node 314 and the output port 312. As illustrated, the only DC current paths from control node 314 are through the phototransistors of optoisolators 320 and 322. When the optoisolators 320 and 322 are disabled and substantially non-conducting, the DC current paths of the control node 314 are substantially non-conducting.

Substantially non-conducting can, but need not mean that zero current will flow from the control node 314 when the optoisolators 320 and 322 are disabled. Rather, the amount of current that can flow is substantially reduced. For example, parasitic DC current paths can charge or discharge the control node 314. However, the components can be selected such that a time frame over which the voltage on the control node 314 changes can be controlled such that the output through the output port 312 can remain substantially the same for a desired time period.

In addition, the capacitor C2 can aid in maintaining the output level. For example, the capacitor C2 can add additional charge storage to extend the time that the level of the control node 314 is substantially maintained. However, the capacitor C2 can also provide feedback to the control node 314. For example, if the output node 312 is pulled up, control node 314 can be similarly pulled up. As a result, the current through the transistor T2 can increase, countering the effects of the output node 312 being pulled up.

Although a transistor T2 has been described, other circuits with similar properties can be used. For example, additional transistors can be used to increase the output drive capability. Amplifier circuits can be used. Any circuit that can control a current in response to the control node 314 can be used.

Although a variety of circuits, systems, and the like have been described, any combination of such circuits and systems can be combined within an electrical switching module. Moreover, although embodiments have been described with particular implementations of measuring circuits, zero-crossing detectors, or the like, an electrical switching module can include such circuits and can also include other conventional circuits.

According to the inventive principles disclosed herein, power usage and/or demand can be controlled on a real-time basis. The power demand, and hence the power usage, can be controlled by dimming the lights and or modifying sensor delay times such that the changes are substantially imperceptible to occupants in the building.

According to some embodiments, a system to manage power demand in a building comprises: at least one light to illuminate a space in the building; at least one meter to detect power demand for the building; at least one light controller to control power to the at least one light; and a central controller to receive power demand data from the at least one meter and to send a signal to the at least one light controller to modify a light output from the light responsive to the power demand data and a power setpoint. The light controller may comprise, for example, at least one of an electrical switching device, a module controller, a communication interface, and a dimmer interface configured to adjust the light output over a range of light output values. The light controller can be configured to control power to the light and to at least one non-lighting load. The light controller may include a sensor in communication with the module controller to determine individual power demand data associated with the light output. The sensor may include at least one of a position sensor, a zero-crossing detector, a current sensor, and a voltage sensor. The central controller can be configured to receive the power demand data from the meter and the light controller.

According to other embodiments, the system includes a plurality of utility service meters to detect utility service demand for the building. Further, the central controller can be configured to receive utility demand data from the plurality of utility service meters and to send a signal to the light controller to modify a light output from the light responsive to the utility demand data, the power demand data, and the power setpoint. The central controller may be configured to maintain the power demand of the building below the power setpoint. The central controller may also be configured to log the power demand data, analyze logged power demand data, predict future power demand, and modify the light output responsive to the predicted future power demand. The system may also include at least one sensor to detect an amount of light in the space in the building. The light controller may switch lights on and off in the space responsive to the sensor. The central controller may be further configured to adjust a delay time associated with the sensor responsive to the power demand data and the power setpoint.

According to some embodiments, a method for controlling power demand comprises: monitoring a current power demand; determining if the current power demand is approaching a setpoint; determining whether to take corrective measures if the current power demand is approaching the setpoint; determining which corrective measures to implement; and implementing the determined corrective measures. The determined corrective measures may include modifying lighting. The method may also include logging the current power demand. Further, determining if the current power demand is approaching the setpoint can include comparing the setpoint to the logged power demand. Determining whether to take corrective measures may include analyzing logged power demand and predicting future power demand. Moreover, monitoring the current power demand may include receiving power demand data from at least one individual light controller.

According to other embodiments, the method may include logging the corrective measures. Also, at least one of determining whether to take corrective measures and determining which corrective measures to implement can include analyzing the logged corrective measures. Implementing the corrective measures may include dimming the lighting. Dimming the lighting can include dimming the lighting at a rate that is substantially imperceptible to occupants of a building.

According to still other embodiments, the method includes receiving an event and modifying the setpoint responsive to receiving the event. Receiving the event can include, for example, at least one of receiving an input of a new setpoint by a building operator, a predetermined time of day being reached, a predetermined light value being reached, and a demand response signal being received from a utility supplier. The method can also include determining that current power demand has exceeded the setpoint and implementing additional corrective measures to prevent future power demand from exceeding a second setpoint.

According to some embodiments, a system to manage power demand in a building includes: a plurality of lights to illuminate spaces in the building; at least one meter to detect power demand for the building; at least one lighting sub-meter to detect lighting power demand for the building; a plurality of utility service sub-meters to detect utility service demand for the building; at least one light controller to control a light output of the plurality of lights; and a central controller to receive lighting power demand data from the lighting sub-meter, receive utility demand data from the utility service sub-meters, and send a signal to the light controller to modify light output from the lights responsive to the lighting power demand data, utility demand data, and a power setpoint. The light controller can include a dimmer interface configured to adjust the light output over a range of light output values. The plurality of lights can include a plurality of light circuits and the central controller can be further configured to send the signal to the light controller to modify the light output from at least one of the light circuits without affecting the light output from at least one other of the light circuits.

According to other embodiments, the light controller includes: an electrical switching device; a module controller to operate the electrical switching device; a communication interface operatively coupling the module controller to the central controller; and a sensor in communication with the module controller to determine individual power demand data associated with the light controller. The module controller can be configured to provide the individual power demand data to the central controller. The sensor may include at least one of a position sensor, a zero-crossing detector, a current sensor, and a voltage sensor. The light controller may be configured to control a light output of the plurality of lights and to control at least one non-lighting load. The light controller may also be configured to monitor power demand associated with the light controller and the central controller may be configured to receive power demand data from the light controller.

Although the above-described embodiments refer to a building, a person of ordinary skill in the art will recognize that the inventive principles can be applied to multiple buildings and spaces within a building. Accordingly, the term building does not connote any particular structure or provide any limitation on the type of structures in which the inventive principles are applied. As an example, the inventive principles can be applied to a network of buildings distributed across a large geographic region that are commonly controlled at a central location.

Moreover, the inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A system for managing utility services in a building, the system comprising:
    at least one building load;
    at least one utility meter to measure an amount of power consumed within a building and to output demand data corresponding to the amount of power consumed within the building;
    at least one sub-meter to measure an amount of power consumed by the at least one building load;
    at least one building load controller to control power to the at least building load, wherein the at least one building load controller can control the at least one of building load; and
    a central controller to receive the demand data from the at least one sub-meter or the at least one utility meter and to send a signal to the building load controller to adjust the at least one of building load in response to the demand data,
    wherein the central controller is configured to maintain the amount of power consumed within the building below a power setpoint set by a user or utility company such that the amount of power consumed within the building does not exceed the power setpoint,
    wherein the central controller is configured to receive a new power setpoint from the at least one sub-meter or the at least one utility meter and to adjust the amount of power consumed within the building such that the amount of power consumed within the building does not exceed the new power setpoint; and
    wherein the building load controller modifies the at least one building load by turning the at least one building load on or off or by reducing power to the at least one building load.

2. The system of claim 1, wherein the central controller is able to receive demand data from the at least one utility meter and to send a signal to the building load controller to adjust the at least one building load responsive to the demand data.

3. The system of claim 1, wherein the demand data is an instantaneous value of the amount of power consumed within the building.

4. The system of claim 1, wherein the demand data comprises a trend line value of the amount of power consumed within the building.

5. The system of claim 1, wherein the at least one building load includes an interior lighting system, and wherein the central controller sends a signal to the building load controller to adjust the interior lighting system such that a set amount of light is maintained within an interior of the building.

6. The system of claim 5, wherein the set amount of light maintained within the interior of the building includes an amount of light provided by the interior lighting system and an amount of natural light, the building load controller decreases the amount of light provided by the interior lighting system in a specified space as the amount of natural light monitored in the specified space increases.

7. The system of claim 1, wherein the at least one building load is one of an HVAC system, a water supply system or an electrical lighting system.

8. The system of claim 1, wherein the utility meter is selected from one of a power meter, a gas meter, or a water meter.

9. The system of claim 1, wherein the sub-meter is selected from one of an electric sub-meter, a gas sub-meter or a water sub-meter.

10. The system of claim 1, wherein the central controller is selected from one of a local personal computer, a personal computer connected over a network, a dedicated controller, or a remote server.

11. The system of claim 1, wherein the central controller includes a display and an input device so that the user can interact with the central controller to manually adjust the power setpoint, view data, and manually control the at least one building load.

12. The system of claim 1, wherein the central controller can monitor and control the at least one building load on a real-time basis.

13. The system of claim 1, wherein the power setpoint includes a desired peak power usage for the building and a maximum peak power usage for the building, the user being able to manually input and modify, through the central controller, the power setpoint.

14. The system of claim 1, wherein the central controller can monitor the demand data and make adjustments to the at least one building load to ensure that the amount of power consumed within the building does not exceed the power setpoint.

15. The system of claim 14, wherein the central controller adjusts power to the at least one building load by making adjustments to the at least one building load such that the adjustments are not perceptible to occupants of the building.

16. The system of claim 1, wherein the central controller controls the amount of power consumed within the building by comparing a current value of the amount of power consumed within the building to the power setpoint at predetermined intervals.

17. The system of claim 1, wherein the central controller controls the amount of power consumed within the building by comparing a current value of the amount of power consumed within the building to the power setpoint on a continuous basis.

18. The system of claim 1, wherein the central controller controls the amount of power consumed within the building by logging the amount of power consumed within the building over time and then periodically comparing trends in the amount of power consumed within the building to the power setpoint to determine if steps are needed to reduce power demand.

19. The system of claim 1, further comprising one or more sensors for monitoring an environmental condition, the one or more sensors being communicatively coupled to the central controller for transmitting data to the central controller, the central controller being adapted to predict increases in the amount of power consumed within the building based on the data received from the one or more sensors, the central controller being further adapted to implement one or more corrective actions to prevent exceeding the power setpoint.

20. The system of claim 19, wherein the one or more corrective actions includes taking steps to reduce the amount of power being consumed by one or more other loads in the building to account for an impending load increase due to one or more loads.

21. The system of claim 19, wherein the one or more sensors is selected from the group consisting of an exterior temperature sensor, an exterior light sensor, an interior temperature sensor, an interior light sensor, and an occupancy sensor.

22. The system of claim 1, wherein the demand data is transmitted to the central controller in response to a query entered by the user at the central controller.

23. The system of claim 1, wherein the building load controller is an electrical switching module including a module controller electrically coupled to one or more the electrical switching devices.

24. The system of claim 23, wherein the one or more electrical switching devices is a plurality of relays and the module controller is configured to monitor the plurality of relays and is configured to actuate the plurality of relays.

25. The system of claim 23, wherein the electrical switching module further comprises a communication interface for communicating with the central controller.

26. A method for real-time power management, the method comprising:
  monitoring an amount of power consumed by at least one building load via at least one sub-meter or at least one utility meter electrically coupled to the at least one building load;
  reporting the amount of power consumed to a central controller;
  making a determination by the central controller whether the amount of power consumed is approaching a setpoint;
  selecting one or more corrective measures as needed based upon the determination;
  implementing the selected corrective measure by sending a signal from the central controller to at least one building load controller electrically coupled to the at least one building load;
  receiving a power demand response signal from a utility supplier;
  establishing a new setpoint responsive to the power demand response signal; and
  repeating the monitoring, reporting, making, selecting and implementing based upon the new setpoint.

27. The method of claim 26, wherein making a determination includes monitoring a rate of increase of the amount of power consumed and a proximity of the amount of power consumed to the setpoint.

28. The method of claim 26, wherein making a determination includes monitoring a time of day, readings from sensors, and a history of prior corrective measures.

29. The method of claim 26, wherein the implementing the selected corrective measure includes one of dimming lights throughout the building, dimming lights in specific spaces in the building, reducing delay times for light controls in the building, or reducing other non-lighting loads in the building.

30. The method of claim 26, wherein making a determination by the central controller whether the amount of power consumed is approaching the setpoint includes comparing an instantaneous value of the amount of power consumed with the setpoint.

31. The method of claim 26, wherein the making a determination by the central controller whether the amount of power consumed is approaching the setpoint includes comparing a plurality of measurements incorporating the amount of power consumed with the setpoint to account for trends in the amount of power consumed.

32. The method of claim 26, wherein the setpoint is one of an instantaneous setpoint or a set amount of total usage for a given time period.

* * * * *